United States Patent
Nagaeda

(10) Patent No.: US 7,280,718 B2
(45) Date of Patent: Oct. 9, 2007

(54) REFLECTIVE ADJUSTABLE OPTICAL DEFLECTOR AND OPTICAL DEVICE EMPLOYING THE SAME

(75) Inventor: Hiroshi Nagaeda, Kitahiroshima (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/994,789

(22) Filed: Nov. 23, 2004

(65) Prior Publication Data
US 2005/0068645 A1    Mar. 31, 2005

(51) Int. Cl.
*G02B 6/42* (2006.01)
*G02B 5/10* (2006.01)

(52) U.S. Cl. ......................... 385/18; 359/852
(58) Field of Classification Search ................. 385/17, 385/18
See application file for complete search history.

(56) References Cited

U.S. PATENT DOCUMENTS

| | | | |
|---|---|---|---|
| 3,485,553 A | 12/1969 | Lee | 350/160 |
| 3,869,197 A | 3/1975 | Owens et al. | 350/161 |
| 4,112,461 A | 9/1978 | Owens | 358/63 |
| 4,838,637 A | 6/1989 | Torok et al. | 350/96.18 |
| 5,082,368 A | 1/1992 | Fuchs et al. | 356/73.1 |
| 5,159,351 A | 10/1992 | Hotomi et al. | 346/108 |
| 5,350,913 A | 9/1994 | Aoshima et al. | 250/205 |
| 5,682,564 A * | 10/1997 | Tsuboi | 396/378 |
| 5,963,682 A * | 10/1999 | Dorschner et al. | 385/16 |
| 6,614,958 B1 * | 9/2003 | Schmidt | 385/33 |
| 6,618,104 B1 * | 9/2003 | Date et al. | 349/86 |
| 6,787,745 B2 * | 9/2004 | Hajjar et al. | 250/201.1 |
| 6,810,164 B2 * | 10/2004 | Dorschner et al. | 385/16 |

FOREIGN PATENT DOCUMENTS

| | | |
|---|---|---|
| JP | 46-41513 | 12/1971 |
| JP | 50-854 | 1/1975 |
| JP | 50-50940 | 5/1975 |
| JP | 53-45539 | 4/1978 |
| JP | 56-120262 | 9/1981 |
| JP | 58-90619 | 5/1983 |
| JP | 58-90620 | 5/1983 |
| JP | 59-5230 | 1/1984 |
| JP | 59-18932 | 1/1984 |
| JP | 60-242434 | 12/1985 |

(Continued)

OTHER PUBLICATIONS

Keiichi Nashimoto, et al., "Low-Voltage Drive Electro-Optic Pb(Zr,Ti)$O_3$ Waveguide Devices Fabricated by Solid-Phase Epitaxy", Proceedings of the SPIE-The International Society for Optical Engineering Conference Title: Proc. SPIE-Int. Soc. Opt. Eng. (USA), vol. 3620, pp. 143-151, Jan. 1999.

(Continued)

*Primary Examiner*—Tina M. Wong
(74) *Attorney, Agent, or Firm*—Staas & Halsey LLP

(57) ABSTRACT

The optical deflector includes the electro-optical element to deflect light by utilizing its refractive index variation, and it also includes a reflective adjustable optical deflector element with a reflective element to reflect the deflected light. This arrangement provides down-sized optical devices, such as variable optical attenuators, optical shutters, and optical switches, with high response speed and low insertion loss.

30 Claims, 20 Drawing Sheets

FOREIGN PATENT DOCUMENTS

| | | |
|---|---|---|
| JP | 61-264325 | 11/1986 |
| JP | 61-270736 | 12/1986 |
| JP | 1-94328 | 4/1989 |
| JP | 1-161127 | 6/1989 |
| JP | 1-293365 | 11/1989 |
| JP | 1-503261 | 11/1989 |
| JP | 5-303125 | 11/1993 |
| JP | 6-35011 | 2/1994 |
| JP | 10-288798 | 10/1998 |
| JP | 10-307307 | 11/1998 |
| JP | 11-264954 | 9/1999 |
| JP | 11-271816 | 10/1999 |
| JP | 11-282029 | 10/1999 |

OTHER PUBLICATIONS

V.I. Kryzhanovskii, et al., "Electro-Optic Reflrection Deflector Made From a KDP Crystal", Soviet Journal of Optical Technology, vol. 45, No. 10, pp. 631-633, Oct. 1978.

V.I. Kryzhanovskii, et al., "Fast-Response Electrooptic Deflectors and Their Use in the Control of Time Parameters of Laser Pulses in the Range $10^{-11}$-$10^{-8}$ sec", Soviet Journal of Quantum Electronics, vol. 12, No. 1, pp. 48-52, Jan. 1982.

Toshio Utsunomiya, et al., "Optical Deflector Using PLZT Ceramics", Proceedings of the Sixth International Meeting on Ferroelectricity, Kobe 1985, Japanese Journal of Applied Physics, vol. 24 (1985) Supplement 24-2, pp. 281-283, (1985).

Toshio Utsunomiya, et al., "Prism-Type Optical Deflector Using PLZT Ceramics", Proceedings of the $5^{th}$ Meeting on Ferroelectric Materials and their Applications, Kyoto 1985, Japanese Journal of Applied Physics, vol. 24, (1985) Supplement 24-3, pp. 169-171.

* cited by examiner

REFLECTIVE ADJUSTABLE OPTICAL DEFLECTOR AND OPTICAL DEVICE EMPLOYING THE SAME

CROSS REFERENCE TO RELATED APPLICATIONS

This application is based on and hereby claims priority to PCT International Application No. PCT/JP02/06583 filed in Japan on Jun. 28, 2002, the contents of which are hereby incorporated by reference.

BACKGROUND OF THE INVENTION

1. Field of the Invention

The present invention relates to reflective adjustable optical deflectors employing elements with electro-optical effects (the Pockels effect). The invention also relates to optical devices, such as variable optical attenuators and optical switches, employing the reflective adjustable optical deflectors.

2. Description of the Related Art

The following (1) through (4) methods have been used as techniques for attenuating light.

(1) Shields disposed on optical paths are mechanically moved to change the transmittance.

(2) A material whose refractive index depends on temperature is inserted in the middle of a waveguide Mach-Zehnder interferometer, and either one of the optical paths, before or after the material, is heated or cooled to change the interference, the transmittance thereby being changed.

(3) A Faraday rotator is inserted between a polarizer and an analyzer, to vary the magnetism applied to the Faraday rotator, thereby rotating a polarization of transmission light. This causes a mismatch between the polarization of the beam and that of the analyzer, the transmittance thereby being changed.

(4) A portion of the cladding of an optical fiber is removed, and a material whose refractive index depends on temperature is filled thereinto. This changes the refractive index relationship between the core and the cladding, thereby inducing radiation, so that the transmittance is changed.

These methods have the following problem. Since the response speed in these methods is limited to a few hundred micro seconds at best, the methods cannot support a higher speed response which is required, for example, when adding/dropping signal channels and when dynamic crossconnect is performed in WDM systems.

In view of this, a technique has been reported in which is applied high-speed response technology that is originally for use in optical amplifiers or the like. A Mach-Zehnder interferometer is prepared using a waveguide which is formed by an element (for example, $LiNbO_3$) with electro-optical effects, and voltage is applied to only either one of the optical paths, to induce attenuation. However, this technique still has problems of high insertion loss and high polarization-dependent loss. Further, when applying this technique to WDM transmission apparatus, variable optical attenuators equal in number to the multiplexed wavelengths are required. Considering numerous wavelengths transmitted in recent WDM transmission systems, the attenuators are inappropriate in size, resulting in increases in size of the WDM transmission apparatus.

With the foregoing problems in view, it is an object of the present invention to provide down-sized optical devices, such as variable optical attenuators and optical switches, which are high in response speed and low in insertion loss and polarization-dependent loss, by employing a reflective adjustable optical deflector in such devices.

Here, adjustable optical deflectors themselves, as disclosed in Japanese Patent Application Publication Number HEI 10-307307 and also in HEI 10-288798, are well known for use in scanners equipped in laser printers, laser scanning microscopes, and barcode readers, but are not suitable for use in wavelength-Division Multiplex (WDM) transmission apparatus.

This is because of the construction of the previous adjustable optical deflectors. More specifically, incoming light from the input optical system enters the deflector from its input side, and passes through the deflector, and goes out from its output side, which is disposed opposite the input side, and the transmitted light is then directly received by the output optical system. This construction makes it necessary to arrange the input optical system, the adjustable optical deflector, and the output optical system, in an almost straight line, thus causing downsizing limitation. Therefore, in cases where an increased number of channels are to be transmitted, this will cause increased apparatus size.

SUMMARY OF THE INVENTION

In order to accomplish the above object, according to the present invention, there is provided a reflective adjustable optical deflector, comprising: an adjustable optical deflector element which transmits incoming light and outputs the transmitted light at an output angle that depends on an externally input signal; and a reflector element which reflects the transmitted light output from the adjustable optical deflector element.

As one preferred feature, the reflective adjustable optical deflector further comprises: a light-concentrating means which concentrates input collimated light and inputs the concentrated light into the adjustable optical deflector element; and an output collimator which receives and collimates light reflected from the reflector element.

As another preferred feature, the adjustable optical deflector element is a refractive index-controllable element which is wedge-shaped on a plane where the input light travels and whose refractive index changes in accordance with the externally input signal.

As still another preferred feature, the refractive index-controllable element is an electro-optical element, and the electro-optical element is preferred to include a PLZT {(Pb, La) $(Zr,Ti)O_3$} crystal. In addition, it is also preferred that the reflector element is a reflective plate or a reflective film disposed on an output side of the adjustable optical deflector element.

As a generic feature, there is provided an optical device that employs a reflective adjustable optical deflector, which optical device comprises:

(1) an input optical fiber;

(2) an input collimator which collimates light output from the input optical fiber;

(3) an input light-concentrating means which concentrates collimated light output from the input collimator;

(4) a reflective adjustable optical deflector including: an adjustable optical deflector element which transmits the light concentrated by the light-concentrating means and outputs the transmitted light at an output angle that depends on an externally input signal; and a reflector element which reflects the transmitted light output from the adjustable optical deflector element;

(5) an output collimator which receives and collimates light reflected from the reflector element of the reflective adjustable optical deflector;

(6) an output light-concentrating means which concentrates the collimated light output from the output collimator; and (7) an output optical fiber which is disposed in such a manner that its core is located at a position at which the light output from the output light-concentrating means is concentrated.

As one preferred feature, the optical device changes the output angle of the transmitted light by controlling the externally input signal, so as to change the amount of light which is output from the output light-concentrating means and is concentrated onto the core of the output optical fiber, the optical device thereby functioning as a variable optical attenuator which is capable of varying an optical output intensity of the output optical fiber. Further, the optical device changes the output angle of the transmitted light by controlling the externally input signal, so as to concentrate the light output from the output collimator at another position than the core of the output optical fiber, the optical device thereby functioning as an optical shutter which shuts out the optical output of the output optical fiber.

As another preferred feature, the input optical fiber and the output optical fiber are integrally fastened by a 2-core ferrule, and the input collimator and the output light-concentrating means are realized by a single lens. Further, the input light-concentrating means and the output collimator can be realized by a single lens.

As still another preferred feature, n (n is an integer equal to or greater than 2) input optical fibers and n output optical fibers are provided, and these (2×n) optical fibers are integrally fixed by a (2×n)-core ferrule, and also, the input collimator, which collimates light output from each of the n input optical fibers, and the output light-concentrating means, which concentrates n collimated light beams output from the output collimator into n respective output optical fibers, are realized by a single lens.

As another generic feature, there is provided an optical device that employs a reflective adjustable optical deflector, which optical device comprises:

(1) an input optical fiber, (2) an input collimator which collimates light output from the input optical fiber;

(3) an input light-concentrating means which concentrates collimated light output from the input collimator;

(4) a reflective adjustable optical deflector including: an adjustable optical deflector element which transmits the light concentrated by the light-concentrating means and outputs the transmitted light at an output angle that depends on an externally input signal; and a reflector element which reflects the transmitted light output from the adjustable optical deflector element;

(5) an output collimator which receives and collimates light reflected from the reflector element of the reflective adjustable optical deflector;

(6) an output light-concentrating means which concentrates the collimated light output from the output collimator; and (7) n (n is an integer equal to or greater than 2) output optical fibers which are disposed in such a manner that their cores are located at a plurality of positions on which the light output from the output light-concentrating means is concentrated in accordance with the output angle of the transmitted light, the optical device thereby functioning as a 1×n optical switch which concentrates the light output from the output light-concentrating means onto the core of one of then output optical fibers, by switching the externally input signal into a predetermined value so as to change the output angle of the transmitted light.

As one preferred feature, the input optical fiber and the n output optical fibers are integrally fastened by a multi-core ferrule, and the input collimator and the output light-concentrating means are realized by a single lens. In addition, the input light-concentrating means and the output collimator can be realized by a single lens.

As another preferred feature, the 1×n optical switch continuously changes the externally input signal, to change the amount of light concentrated onto the core of one output optical fiber so as to control an optical output intensity of the above-mentioned one optical output fiber, the 1×n optical switch thereby being operable also as a variable optical attenuator which is capable of varying an optical output intensity of the output optical fiber. In that case, it is preferred that the 1×n optical switch includes: a controllable optical attenuation signal source which generates the externally input signal that continuously changes to activate the function as the variable optical attenuator; and a switching signal source which generates the externally input signal of the predetermined value.

As still another generic feature, there is provided an optical device that employs a reflective adjustable optical deflector, which optical device comprises:

(1) n (n is an integer equal to or greater than 2) input optical fibers, (2) an input collimator which collimates light output from the n input optical fibers;

(3) an input light-concentrating means which concentrates collimated light output from the input collimator;

(4) n reflective adjustable optical deflectors each including: an adjustable optical deflector element which transmits the light concentrated by the light-concentrating means and outputs the transmitted light at an output angle that depends on an externally input signal; and a reflector element which reflects the transmitted light output from the adjustable optical deflector element;

(5) an output collimator which receives and collimates light reflected from the reflector element of each of the reflective adjustable optical deflectors;

(6) an output light-concentrating means which concentrates the collimated light output from the output collimator; and (7) m (m is an integer equal to or greater than 1) output optical fibers which are disposed in such a manner that their cores are located at one or more positions on which the light output from the input collimator is concentrated in accordance with the output angles of the transmitted light, the optical device thereby functioning as an n×m optical switch which concentrates the light, input from one of the n input optical fibers and output from the output light-concentrating means, onto one of the cores of the m output optical fibers, by switching the externally input signal into a predetermined value so as to change the output angle of the transmitted light.

As one preferred feature, if m is equal to or grater than 2, the optical device further comprises an optical path changing means which changes an optical path between the input optical fibers and the output optical fibers in accordance with a layout relationship between the input optical fibers and the output optical fibers.

As another preferred feature, the n input optical fibers and the m output optical fibers are integrally fastened by a multi-core ferrule, and the input collimator and the output light-concentrating means are realized by a single lens. Further, the input light-concentrating means and the output collimator can be realized by a single lens.

Other objects and further features of the present invention will be apparent from the following detailed description when read in conjunction with the accompanying drawings.

DESCRIPTION OF THE PREFERRED EMBODIMENT(S)

(A) Reflective Adjustable Optical Deflector

Figure 1:
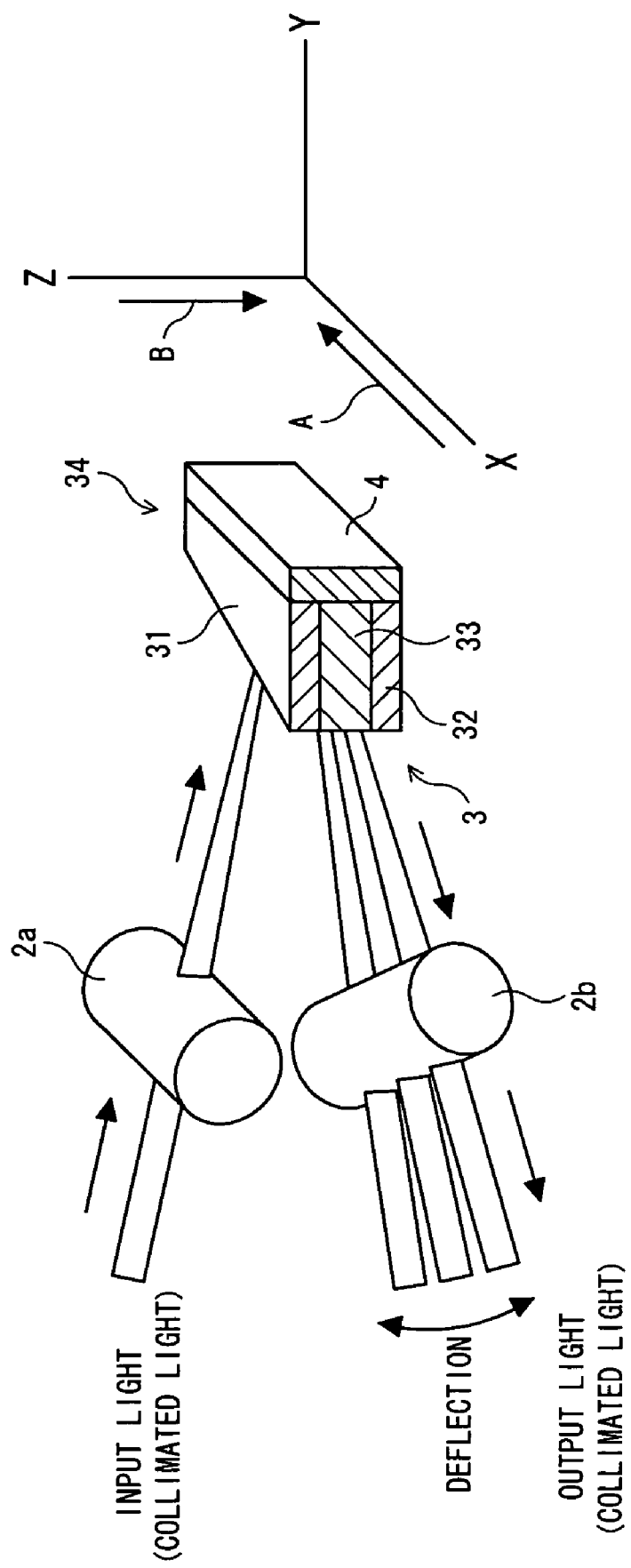
FIG. 1 is a schematic perspective view showing a construction of a reflective adjustable optical deflector according to one preferred embodiment of the present invention, with optical paths being illustrated therewith.
Figure 2:
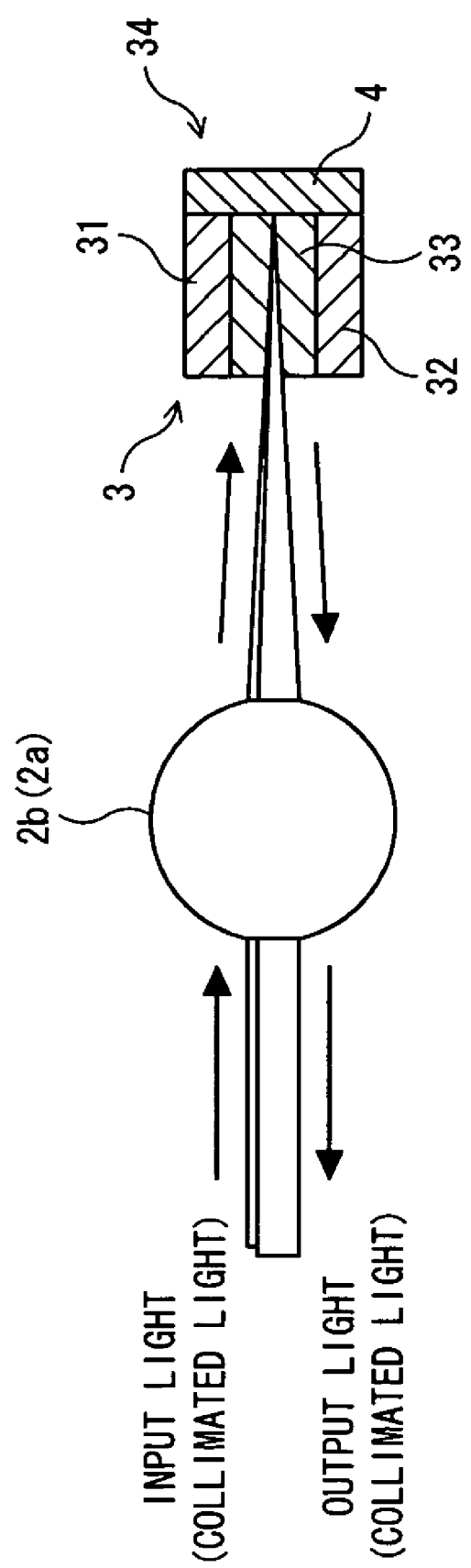
FIG. 2 is a schematic side view of the reflective adjustable optical deflector on arrow A of FIG. 1.
Figure 3:
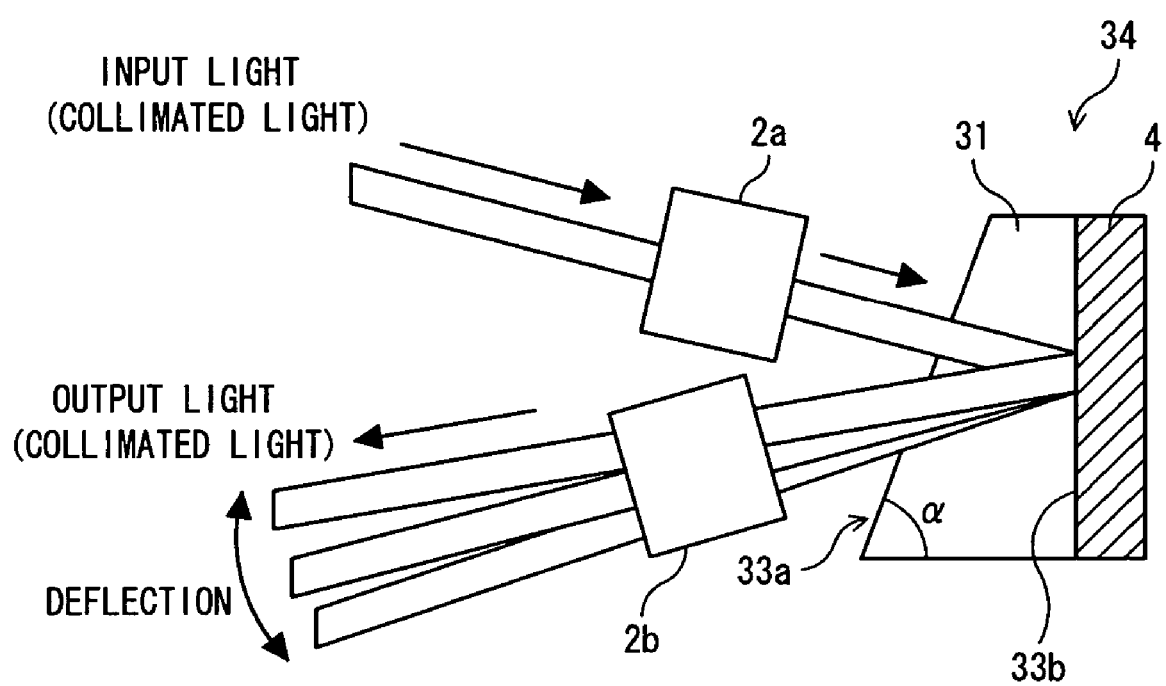
FIG. 3 is a schematic side view of the reflective adjustable optical deflector on arrow B of FIG. 1.

FIG. 1 is a schematic perspective view of a construction of a reflective adjustable optical deflector of one preferred embodiment of the present invention, with optical paths being illustrated therein; FIG. 2 is a schematic side view of the reflective adjustable optical deflector on arrow A of FIG. 1; FIG. 3 is a schematic side view of the reflective adjustable optical deflector on arrow B of FIG. 1.

As shown in FIG. 1 through FIG. 3, the reflective adjustable optical deflector of this embodiment has cylindrical lenses 2a and 2b, an adjustable optical deflector element 3 including electrodes 31 and 32 and an electro-optical element 33, and a reflective element 4 disposed on the side (output side) opposite the light input side of the adjustable optical deflector element 3. Here, an element including an adjustable optical deflector element 3 and a reflective element 4 is named the "reflective adjustable optical deflector element 34".

As shown in FIG. 2, the cylindrical lens (input light-concentrating means) 2a, a first lens, concentrates incoming light (collimated light) only in one direction (the thickness-wise direction of the adjustable optical deflector) on the beam phase of the incoming light, and the lens 2a is placed in such a manner that it focuses the light on the reflective element 4.

As shown in FIG. 1 and FIG. 3, the adjustable optical deflector element 3 is shaped like a wedge (trapezoid) on a plane (the X-Y plane of FIG. 1) on which input light travels, and the element 3 allows the input light, which is concentrated by the cylindrical lens 2a, to pass therethrough. The electro-optical element (refractive index controllable element) 33 of the adjustable optical deflector element 3 changes its refractive index depending on voltage (externally input signal) applied to the electrodes 31 and 32, whereby an output angle of the output light from the adjustable optical deflector element 3 is changed (that is, a reflection angle of the reflected light by the reflective element 4 is changed).

Further, the cylindrical lens 2b, a second lens, serves as an output collimator which collimates the light reflected from the reflective element 4, and the lens 2b has a width (in the X-axis direction) such that the output light in the X-axis direction of FIG. 1, ejected in a range of angles corresponding to the aforementioned angle change, can be fully received.

The electro-optical element 33 is arranged in such a manner that its trapezoidal side is in parallel with the X-Y plane of FIG. 1. For the purpose of applying voltage in the Z-direction of FIG. 1, there are provided a pair of electrodes 31 and 32 having an identical trapezoidal shape to that of the electro-optical element 33, on both sides (in the Z-direction) of the electro-optical element 33, so as to sandwich the electro-optical element 33 therebetween. The electro-optical element 33 can be realized by a PLZT {(Pb, La) (Zr, Ti)$O_3$} crystal, for example, and the following are also applicable as the electro-optical element 33: a LiNbO$_3$ crystal and compound semiconductors such as GaAs and InP, having similar electro-optical effects; polymers (for example, epoxy EO polymer) having electro-optical effects similar to those of the PLZT crystal.

In this embodiment, since the input light is concentrated by the cylindrical lens 2a in the Z-direction, the distance between the electrodes 31 and 32 can be as small as 10 to 30 μm, it is possible to efficiently apply voltage to the electro-optical element 33. Here, the reflective element 4 can be a flat-shaped reflecting plate 34 which is in contact with the side 33b that is on the opposite side of the adjustable optical deflector element 3 to the input side 33a, or can be a reflective film formed on the side 33b.

Further, if at least the electrodes 31 and 32 have a wedge-like (trapezoidal) or triangle shape, the refractive index of the electro-optical element 33 can be changed in accordance with voltage applied thereto, the output angle (reflected light angle) of the light which passes through the element 33 thereby being changed. Therefore, the electro-optical element 33 does not have to be identical in shape with the electrodes 31 and 32, and it can have, for example, a rectangular shape. Furthermore, the electrodes 31 and 32 do not have to be in contact with the reflective element 4. In addition, since the beam input/output side of the adjustable optical deflector element 3 does not have to have any special intakes for beam phase shaping, the beam input/output side can have a simple shape which is cut or ground rectilinearly.

Now a description will be made of an operation of the reflective adjustable optical deflector (hereinafter will be also called simply the "adjustable optical deflector") of the present embodiment.

First of all, when incoming light (collimated light) is input to the cylindrical lens 2a, the light is concentrated only in one direction (the Z-axis direction of FIG. 1) of its beam phase, and then the light is input to the electro-optical element 33 of the adjustable optical deflector element 3. Voltage is then applied to the electrodes 31 and 32, so that the refractive index of the electro-optical element 33 is changed.

Here, when viewed (FIG. 2) on arrow A of FIG. 1, the adjustable optical deflector element 3 has flat-shaped surfaces in parallel, so that the change in refractive index caused by the voltage application does not change the direction of the light beam. However, when viewed (FIG. 3) on arrow B of FIG. 1, the adjustable optical deflector element 3 has a trapezoidal shape on the X-Y plane, so that the change in refractive index caused by the voltage application does change the direction of the light beam (an optical path from the reflective element 4 to the cylindrical lens 2b).

Figure 4:
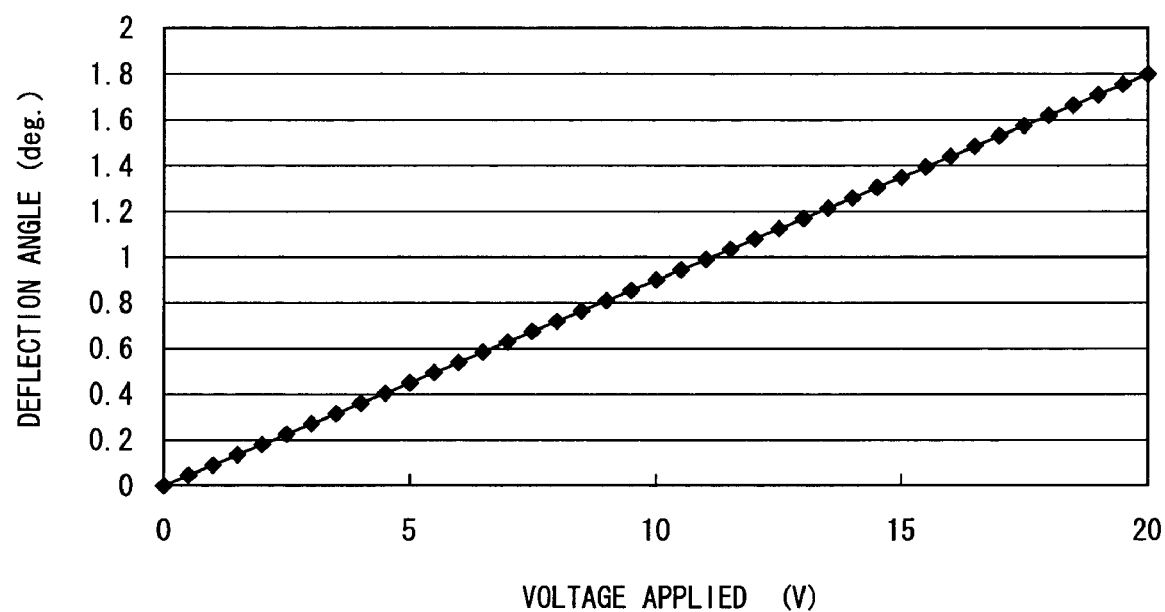
FIG. 4 is a graph indicating a relationship between deflection degrees and applied voltages according to the present embodiment.

Here, FIG. 4 indicates the relationship between the applied voltage (V) and the deflection angle (degree). As shown in FIG. 4, a change in applied voltage from 0 V to 8 V causes a change in angle of approximately 0.75°. Note that the tapered angle α (see FIG. 3) of the trapezoidal shape of the adjustable optical deflector element 3 is set to 70°. Such an element with a changeable refractive index can be realized not only by the electro-optical element 33 but also by an element whose refractive index depends on temperature, magnetism, or stress. However, such elements are not suitable for use in WDM transmission apparatus, which performs high-speed multi-wavelength transmission, because of its inferiority in response speed and in size.

(B) Optical Device with a Reflective Adjustable Optical Deflector Employed Therein Next, a description will be made of optical devices (variable optical attenuators, optical shutters, optical switches, or the like) that employ the above adjustable optical deflector (reflective adjustable optical deflector element 34).

(B1) Optical Attenuator with an Adjustable Optical Deflector Employed Therein

Figure 5:
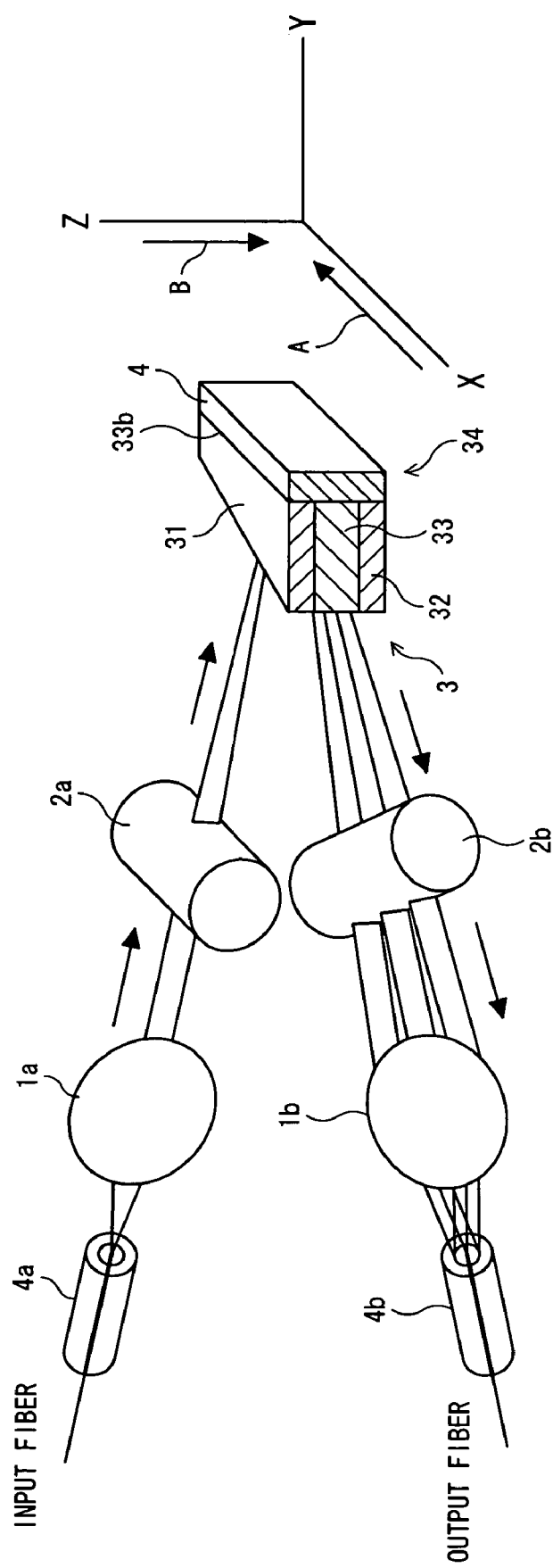
FIG. 5 is a schematic perspective view showing a construction of a variable optical attenuator which functions as an optical device employing an adjustable optical deflector according to the present embodiment, with optical paths being illustrated therein.
Figure 6:
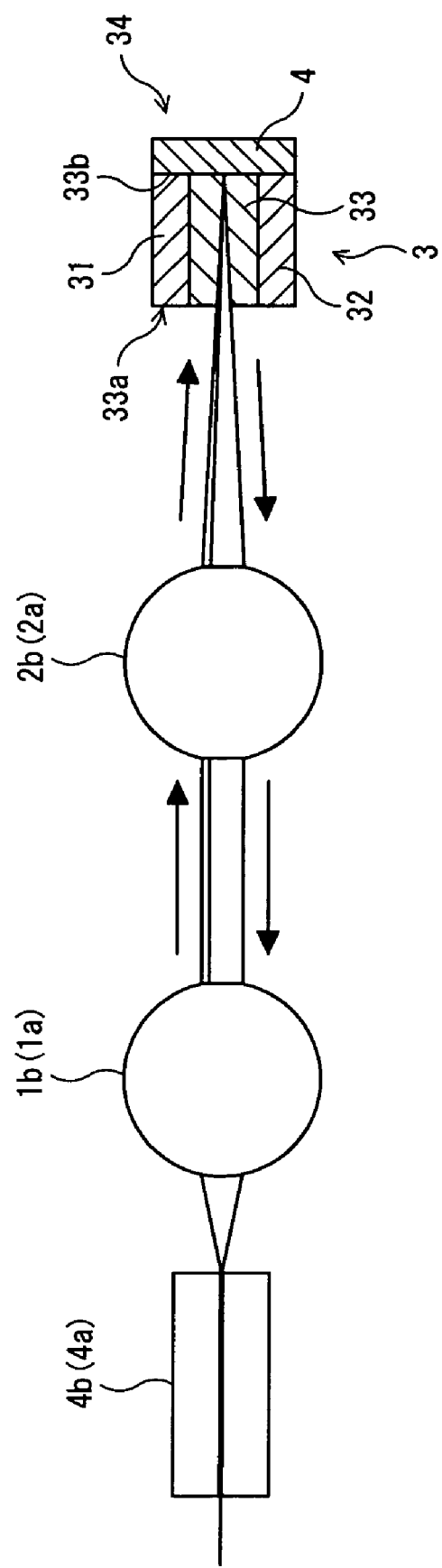
FIG. 6 is a schematic side view of the variable optical attenuator on arrow A of FIG. 5.
Figure 7:
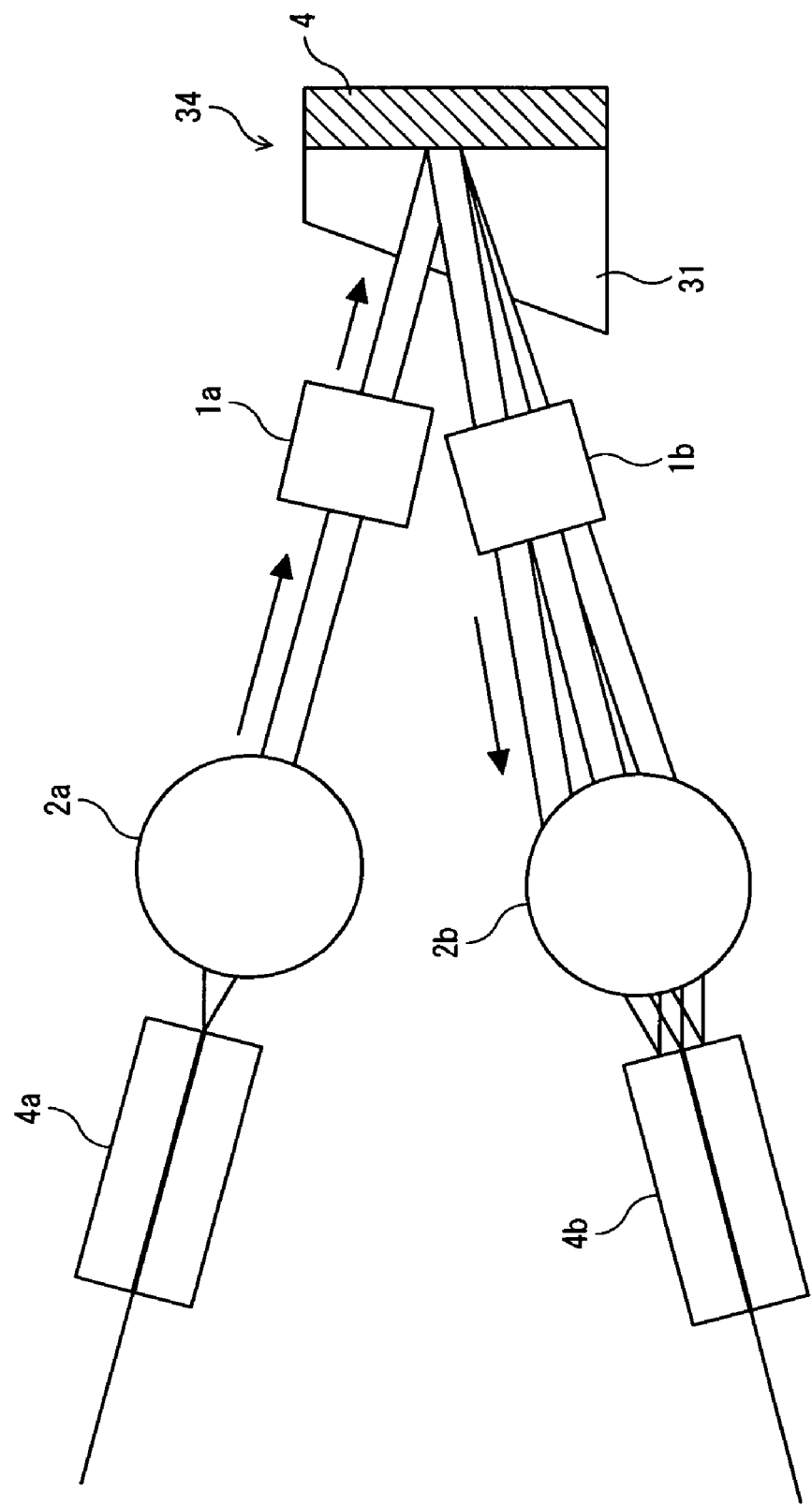
FIG. 7 is a schematic side view of the variable optical attenuator on arrow B of FIG. 5.

FIG. 5 is a schematic perspective view showing a construction of a variable optical attenuator which functions as an optical device employing the above adjustable optical deflector, with optical paths being illustrated therein; FIG. 6 is a schematic side view of the variable optical attenuator on arrow A of FIG. 5; FIG. 7 is a schematic side view of the variable optical attenuator on arrow B of FIG. 5. As shown in FIG. 5 through FIG. 7, the adjustable optical deflector of this embodiment has an input optical fiber 4a, output optical fiber 4b, input collimator lens (spherical or non-spherical lens) 1a, output collimator lens (spherical or non-spherical lens) 1b, in addition to the above-described construction which was detailed above, referring to FIG. 1 through FIG. 3.

Here, the input collimator lens (input collimator) 1a, a third lens, collimates light ejected from the input optical fiber 4a, and the collimated light is input to the cylindrical lens 2a. In addition, the output collimator lens (output light-concentrating means) 1b, a fourth lens, concentrates the ejected light (reflected light from the reflective element 4) from the cylindrical lens 2b and focuses the light on the core of the output optical fiber 4b.

In the present example, the input collimator lens 1a (1b) is a non-spherical lens with a refractive index of 1.87 and a focusing distance (f) of 4.0 mm, and the cylindrical lens 2a (2b) is a lens with a refractive index of 1.87 and a focusing distance (f) of 1.8 mm.

The thus constructed adjustable optical deflector operates as follows.

Light output from the input optical fiber 4a is collimated by the input collimator lens 1a, which is a third lens, and the collimated light is input to the first lens (cylindrical lens) 2a. Then, as in the case of the above description, the cylindrical lens 2a concentrates the input collimated light only in a single direction (the Z-axis direction of FIG. 5) of the light beam phase of the input collimated light, and the light passes through the adjustable optical deflector element 3 (electro-optical element 33) and is then reflected by the reflective element 4.

The light thus reflected by the reflective element 4 is collimated by the second lens (cylindrical lens) 2b with equivalent characteristics of those of the cylindrical lens 2a disposed on the input end, and the collimated light is then focused on the core of the output optical fiber 4b through the fourth lens (collimated lens) with equivalent characteristics of those of the input collimator lens 1a.

Here, assuming that the collimator lens 1b and the output optical fiber 4b are positioned such that the most efficient optical coupling occurs with no voltage applied to the adjustable optical deflector element 3 (electrodes 31 and 32), any voltage application will change an output angle of the light output by the adjustable optical deflector element 3, so that an input angle of the light input to the cylindrical lens 2b and to the output collimator lens 1b is changed. This causes the light beam to be concentrated on a position different from the center of the core of the output optical fiber 4b, thereby deteriorating the optical coupling efficiency into the output optical fiber 4b.

Figure 8:
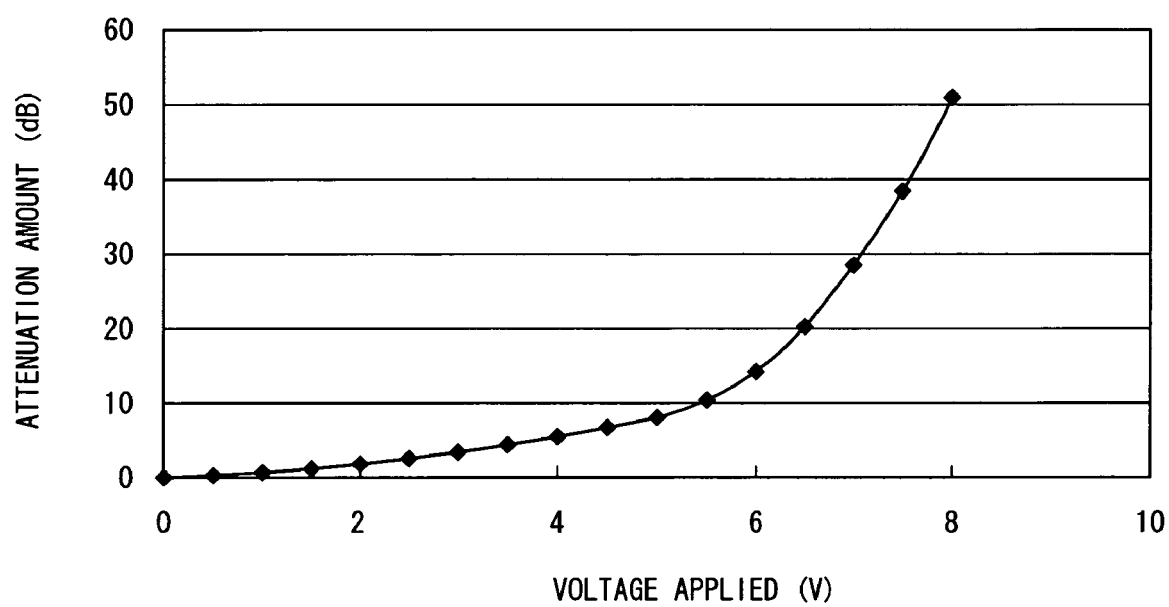
FIG. 8 is a graph indicating an example of the characteristic (attenuation amounts with respect to applied voltages) of the variable optical attenuator of FIG. 5 through FIG. 7.

In this manner, the applied voltage (externally input signal) is changed to adjust the output angle of the light output from the adjustable optical deflector element 3, thereby changing the amount of light concentrated on the core of the output optical fiber 4b. This makes the optical output intensity of the output optical fiber 4b variable. FIG. 8 shows an example of characteristics (the amount of attenuation with respect to the applied voltage) of the variable optical attenuator of the present embodiment. As shown in FIG. 8, the present variable optical attenuator realizes an attenuation amount of 50 dB or greater for the 0V to 8V change in applied voltage.

The optical attenuator of the present embodiment is designed such that the most efficient optical coupling occurs with no voltage applied, so that the more the applied voltage increases, the more the attenuation amount increases. On the other hand, provided that the optical attenuator of the present embodiment is designed such that the most efficient optical coupling occurs with the maximum voltage applied, the attenuation reaches its maximum amount with no voltage applied. Therefore, the more the applied voltage increases, the more the attenuation amount decreases.

Here, in the present embodiment, the reflective element 4 of the reflective adjustable optical deflector element 34 reflects light that has passed through the electro-optical element 33, and this makes it possible to arrange the light output side, from which the light output from the input optical fiber 4a is ejected, and the light input side, to which light from the output optical fiber 4b is input, on the same plane.

Figure 9:
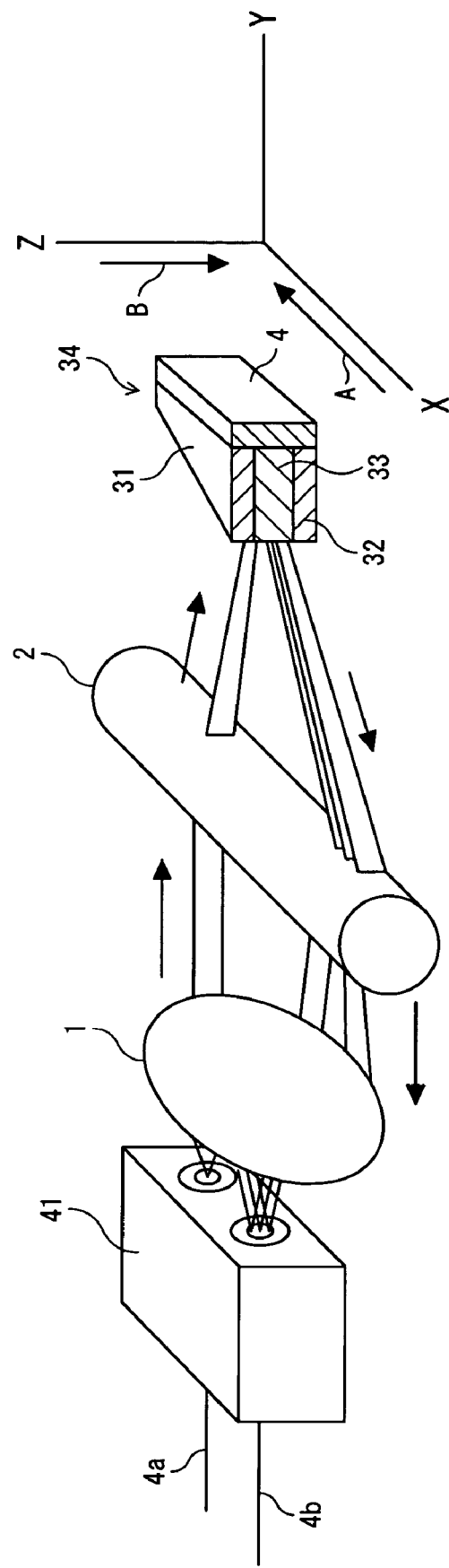
FIG. 9 is a schematic perspective view showing a modified example of the variable optical attenuator of FIG. 5 through FIG. 7.

Thus, as shown in FIG. 9, for example, a 2-core ferrule can be employed to integrally secure the input optical fiber 4a and the output optical fiber 4b therein. Further, the aforementioned two collimator lenses 1a and 1b (input collimator and output light-concentrating means), the former being provided for an optical path (the input optical path; the go path) which extends from the input optical fiber 4a to the reflective element 4, the latter being provided for an optical path (the output optical path; return path) which extends from the reflective element 4 to the output optical fiber 4b, can be realized by a single collimator lens 1. Likewise, the aforementioned cylindrical lenses 2a and 2b (input light-concentrating means and output collimator) can be realized by a single cylindrical lens 2.

This arrangement will realize a greatly down-sized optical attenuator in comparison with the one in which lenses are separately provided for an input and an output path. It is of course possible to realize the above commonality for only either the collimator lenses 1a and 1b or the cylindrical lenses 2a and 2b.

Figure 10:
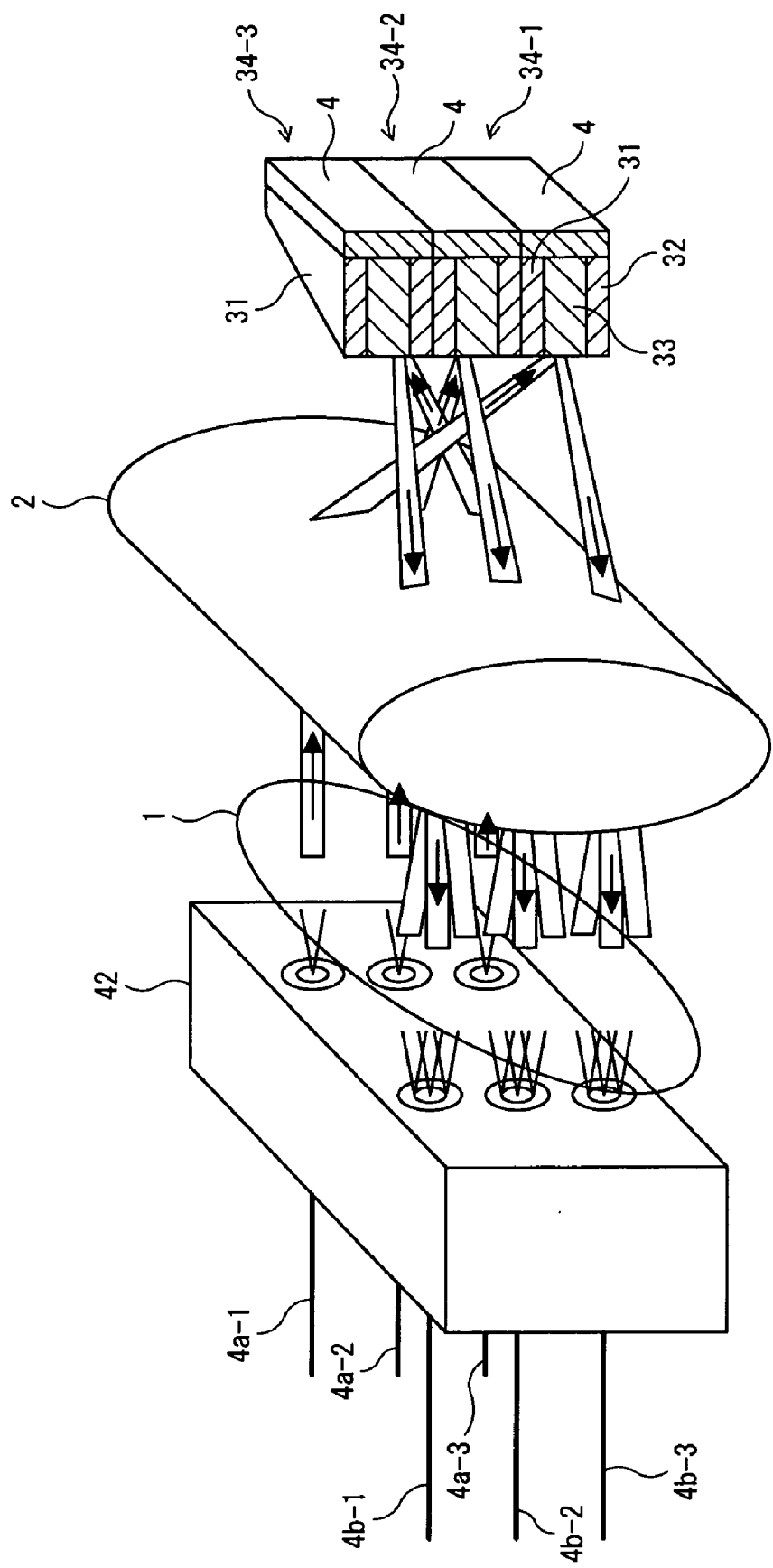
FIG. 10 is another schematic perspective view showing a modified example of the variable optical attenuator of FIG. 5 through FIG. 7.

Further, as shown in FIG. 10, for example, two or more (three in FIG. 10) input optical fibers, 4a-1, 4a-2, and 4a-3, and output optical fibers, 4b-1, 4b-2, and 4b-3, can be grouped and aligned in two rows, and integrally secured by a 6(=2×3)-core ferrule 42. Reflective adjustable optical deflector elements, 34-1, 34-2, and 34-3, each of which is made up of an adjustable optical deflector element 3 and a reflective element 4, are arranged in three tiers, in parallel with the fiber rows of the 6-core ferrule 42. This arrangement realizes a triplet of variable optical attenuators.

Figure 11:
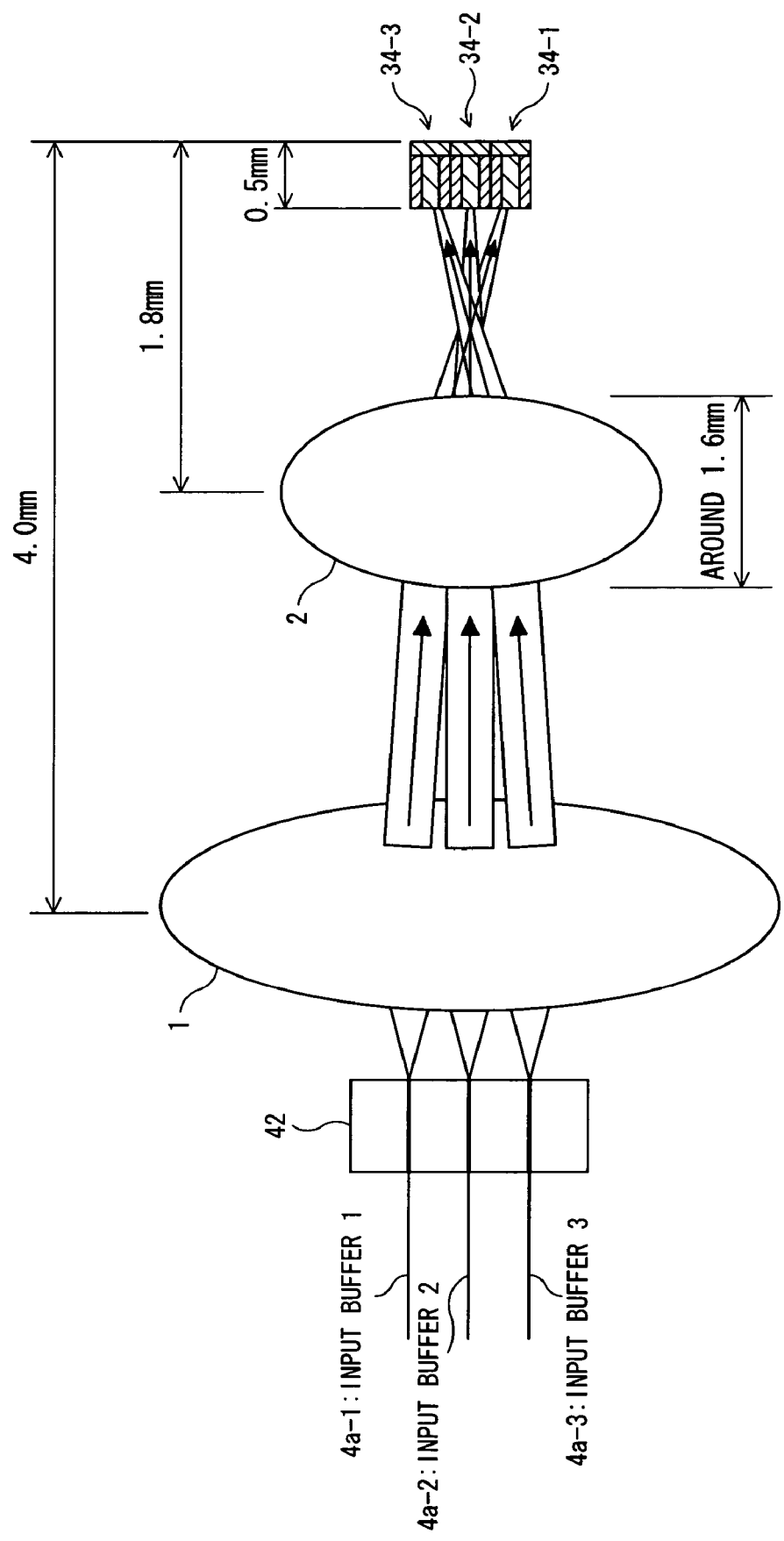
FIG. 11 is a schematic side view describing an optical path (a go path) in the variable optical attenuator of FIG. 10.

Here, as shown in FIG. 11 (a view of the variable optical attenuator on arrow A of FIG. 1), the collimator lens 1 is realized by a non-spherical lens with a refractive index of 1.87 and with a focusing distance (f) of 4.0 mm, and the cylindrical lens 2 is a lens with a refractive index of 1.87 and a focusing distance (f) of 1.8 mm. The distance between the center of the collimator lens 1 and each reflective element 4 of the reflective adjustable optical deflector elements 34-1 through 34-3 is 4 mm; the distance between the center of the cylindrical lens 2 and each reflective element 4 is 1.8 mm; the thickness (in the Y-axis direction in FIG. 10) of the cylindrical lens 2 is approximately 1.6 mm; the depth (in the Y-axis direction in FIG. 10) of each of the reflective adjustable optical deflector elements 34-1 through 34-3 is 0.5 mm.

Figure 12:
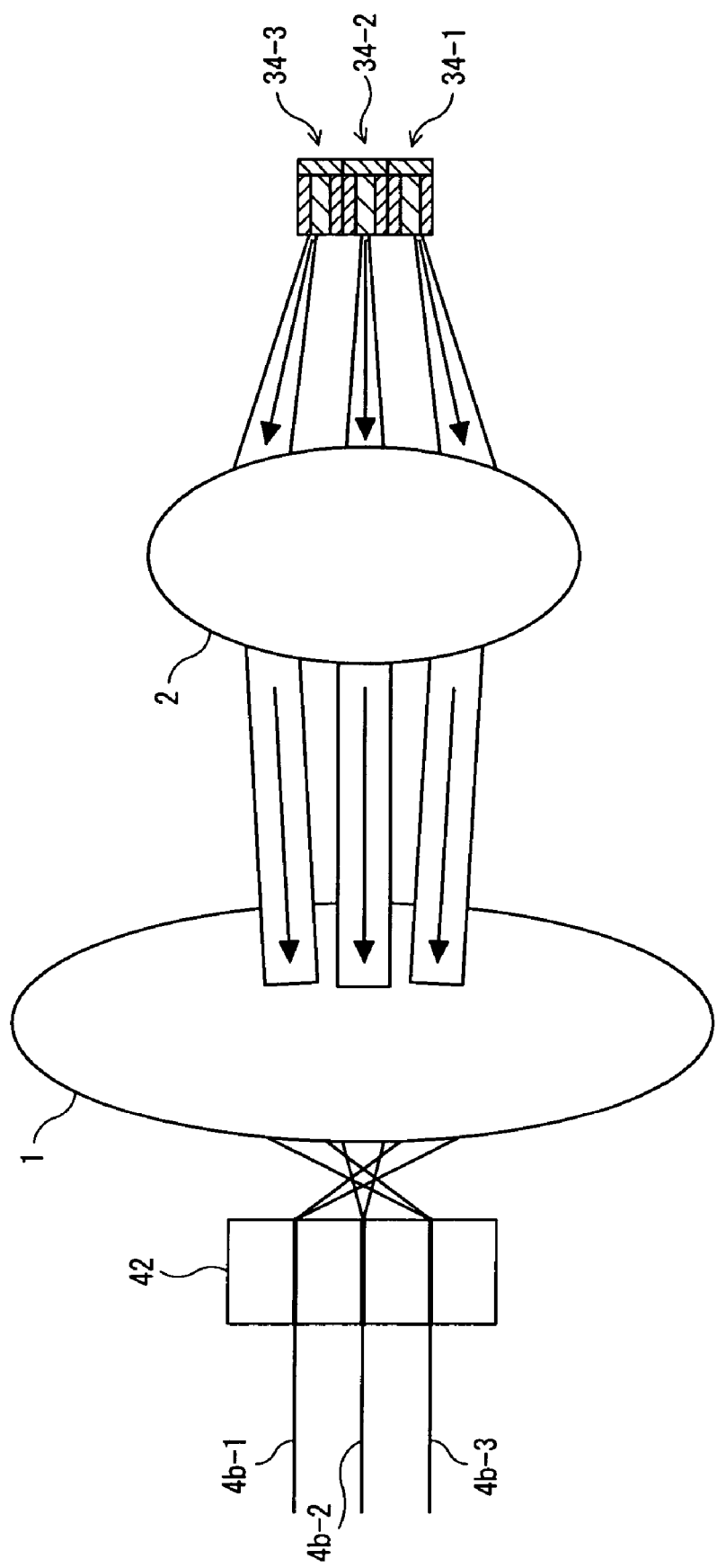
FIG. 12 is a schematic side view describing an optical path (a return path) in the variable optical attenuator of FIG. 10.

The optical paths in this case are shown in FIG. 11 and FIG. 12. As shown in FIG. 11, light output from the input optical fiber 4a-1 that is arranged in the uppermost tier of the 6-core ferrule 42, is collimated by the collimator lens 1, and is then concentrated and diffracted downwards (in the direction of arrow B of FIG. 10) by the cylindrical lens 2, and is then input from an upper part of the cylindrical lens 2 into the lowermost reflective adjustable optical deflector element 34-1.

On the other hand, light output from the input optical fiber 4a-3 that is arranged in the lowermost tier of the 6-core ferrule 42, is collimated by the collimator lens 1, and is then concentrated and diffracted upwards (in the opposite direction from arrow B in FIG. 10) by the cylindrical lens 2, and is then input from a lower part of the cylindrical lens 2 into the uppermost reflective adjustable optical deflector element 34-3. Here, light output from the input optical fiber 4a-2 in the middle tier of the 6-core ferrule 42 passes through the central parts of the collimator lens 1 and of the cylindrical lens 2, and then enters the middle-tier reflective adjustable optical deflector element 34-2.

After that, as shown in FIG. 12, the light reflected by the reflective element 4 of the lowermost reflective adjustable optical deflector element 34-1 enters the lower part of the cylindrical lens 2, and is then collimated therein. The collimated light is then diffracted upwards to enter the collimator lens 1, which concentrates the input light on the core of the output optical fiber 4b-1 arranged in the uppermost tier of the 6-core ferrule 42.

Further, the light reflected by the reflective element 4 of the uppermost reflective adjustable optical deflector element 34-3 enters the upper part of the cylindrical lens 2, and is then collimated therein. The collimated light is then diffracted downwards to enter the collimator lens 1, which concentrates the input light on the core of the output optical fiber 4b-3 arranged in the lowermost tier of the 6-core ferrule 42.

Furthermore, the light reflected by the reflective element 4 of the middle reflective adjustable optical deflector element 34-2 passes through the central part of the cylindrical lens 2 and the collimator lens 1, and is then concentrated on the core of the output optical fiber 4b-2 arranged in the middle tier of the 6-core ferrule 42.

In this manner, in such a triplet of variable optical attenuators, also, the single collimator lens 1 and the single cylindrical lens 2 are common to the input paths (go paths) to the reflective adjustable optical deflector elements 34-1 through 34-3 and the output optical paths (return paths) to the output optical fibers 4b-1 through 4b-3, and these lenses are common also to the reflective adjustable optical deflector elements 34-1 through 34-3. With this arrangement, the individual variable optical attenuators can still operate normally, and further downsizing of the optical device (variable optical attenuator) is realized.

(B2) Optical Shutter with an Adjustable Optical Deflector Employed Therein

Figure 13:
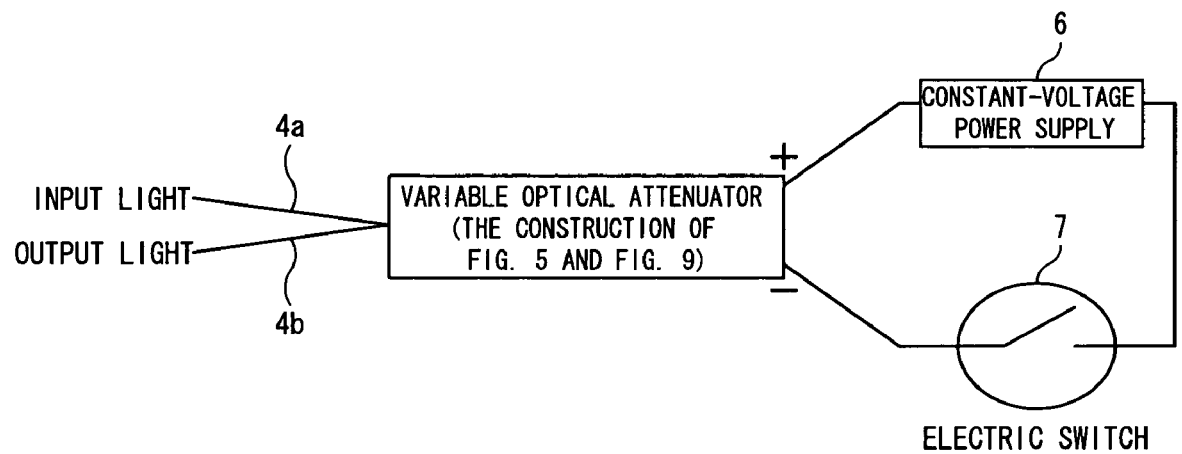
FIG. 13 is a block diagram of a construction for realizing an optical shutter which serves as an optical device employing an adjustable optical deflector of the present embodiment.

In the above construction (optical device) described with reference to FIG. 5 and FIG. 9 (or FIG. 10), a constant-voltage (for example, 8V) power supply 6 and electric switch 7, as shown in FIG. 13, can be employed to realize ON/OFF switching, instead of continuous changing, of applied voltage to the electrodes 31 and 32 of the adjustable optical deflector element 3. This arrangement makes it possible for the optical device to serve as an optical shutter (a triplet of optical shutters) with a shut-out attenuation mount of 40 dB or greater.

That is, by changing applied voltages to the electrodes 31 and 32, the output angle of the light which passes through and is output from the adjustable optical deflector element 3 is changed, so that the collimated light output from the collimator lens 1*b* (1) is concentrated at a position separate from the core of the output optical fiber 4*b* (4*b*-1 through 4*b*-3), whereby the optical output of the output optical fiber 4*b* (4*b*-1 through 4*b*-3) is shut out.

(B3) 1×2 Optical Switch with an Adjustable Optical Deflector Employed Therein

Figure 14:
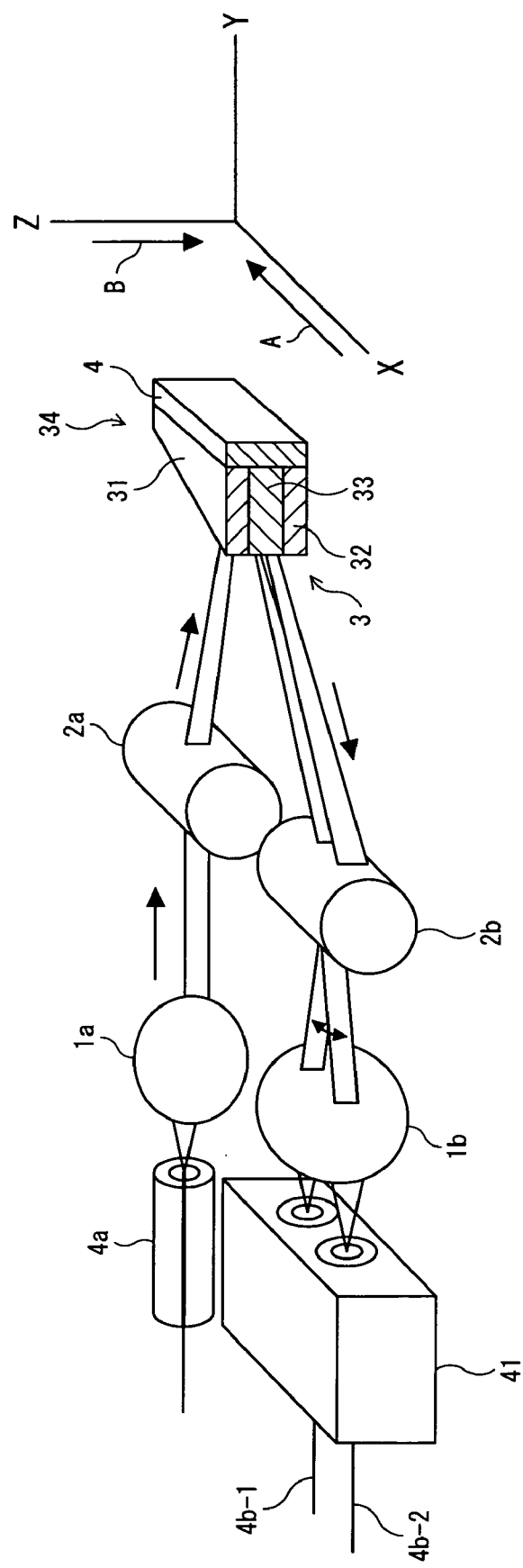
FIG. 14 is a schematic perspective view showing a construction of a 1×2 optical switch which functions as an optical device employing an adjustable optical deflector of FIG. 1 through FIG. 3, with optical paths being illustrated therein.

FIG. 14 is a schematic perspective view showing a construction of a 1×2 optical switch which functions as an optical device employing an adjustable optical deflector of FIG. 1 through FIG. 3, with optical paths being illustrated therein. As shown in FIG. 14, the 1×2 optical switch has an input optical fiber 4*a*, n (=2) output optical fibers 4*b*-1 and 4*b*-2, collimator lenses, 1*a* and 1*b*, and cylindrical lenses, 2*a* and 2*b*, similar to the aforementioned ones with reference to FIG. 5 through FIG. 7, and a reflective adjustable optical deflector element 34 including an adjustable optical deflector element 3 and a reflective element 4, similar to those aforementioned with reference to FIG. 1 through FIG. 3.

Here, the output optical fibers 4*b*-1 and 4*b*-2 are integrally fastened adjacent to each other in the 2-core ferrule 41, and they are arranged such that their cores are placed at positions where light is concentrated by the output collimator lens 1*b* depending on the output angle of the transmitted light (reflected light) which has passed through the reflective adjustable optical deflector element 34. In this case, also, the input collimator lenses 1*a* and 1*b* are non-spherical lenses with a refractive index of 1.87 and a focusing distance (f) of 4.0 mm, and the cylindrical lenses 2*a* and 2*b* are lenses with a refractive index of 1.87 and a focusing distance (f) of 1.8 mm.

This arrangement makes it possible to change the applied voltage to the electrodes 31 and 32 of the adjustable optical deflector element 3 into a predetermined value so as to change the output angle of the transmitted light (reflected light), whereby the light output from the output collimator lens 1*b* is concentrated (switched) into one of the output optical fibers 4*b*-1 and 4*b*-2. Here, in this embodiment, a change in applied voltage by 20V causes a deflection angle of approximately 1.8° (see FIG. 4). Hence, under the aforementioned arrangement condition, the focusing point of the output collimator lens 1*b* is shifted by approximately 125 μm in the X-axis direction of FIG. 14. Accordingly, provided that the distance between the output optical fibers 4*b*-1 and 4*b*-2 is set to 125 μm or smaller, switching between the output optical fibers 4*b*-1 and 4*b*-2 becomes available.

For instance, assuming that light output from the output collimator lens 1*b* with no voltage being applied concentrates onto the core of either one 4*b*-1 (or 4*b*-2) of the two output optical fibers, if voltage (20V) is applied, the light output from the output collimator lens 1*b* is concentrated onto the core of the remaining output optical fiber 4*b*-2 (or 4*b*-1).

Figure 15:
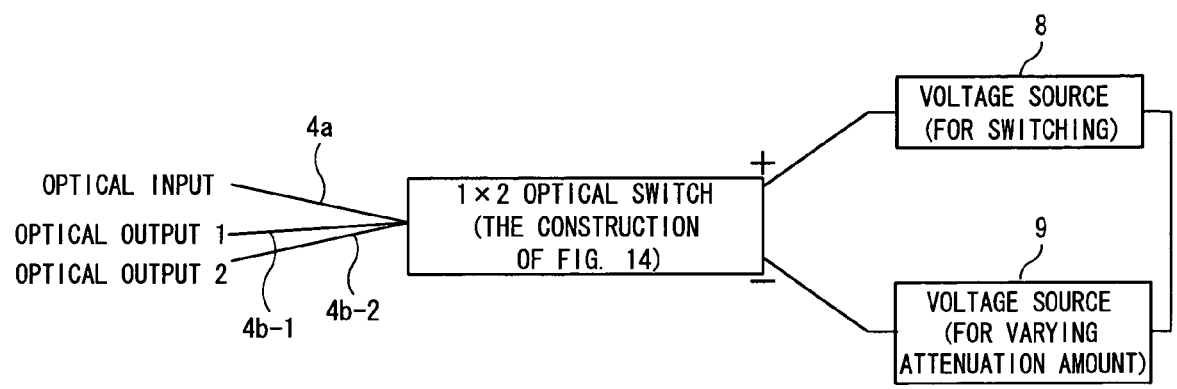
FIG. 15 is a block diagram showing a construction of an optical switch equipped with a function of the variable optical attenuator of FIG. 14.

In this case, as the applied voltage to the electrodes 31 and 32 is continuously changed, centering round the aforementioned predetermined value (for example, 0V or 20V), a deflection angle is also continuously changed, so that not only the above switching function but also the function of a variable optical attenuator is given to the optical device. At this time, as shown in FIG. 15, for example, a couple of voltage sources, one being a voltage source (switching signal source) 8 for generating a predetermined value of voltage to be applied for switching operation, the other being a voltage source (variable optical attenuator signal source) 9 for generating continuously changing voltages for activating the above-mentioned controllable optical attenuation operation, can be prepared as separate elements or as a single element which functions as both of the above.

Here, application of a multi (n)-core ferrule, in place of the 2-core ferrule, will realize a 1×n optical switch in a similar manner. Further, as in the case of the above adjustable optical deflector of FIG. 9, the input optical fiber 4*a* and the output optical fibers 4*b*-1 and 4*b*-2 can be secured in the multi-core ferrule 43 (with three or more cores), as shown in FIG. 16, and the collimator lenses 1*a* and 1*b* can be realized by a single collimator lens 1, and/or the cylindrical lenses 2*a* and 2*b* can be realized by a single collimator lens 1.

Figure 16:
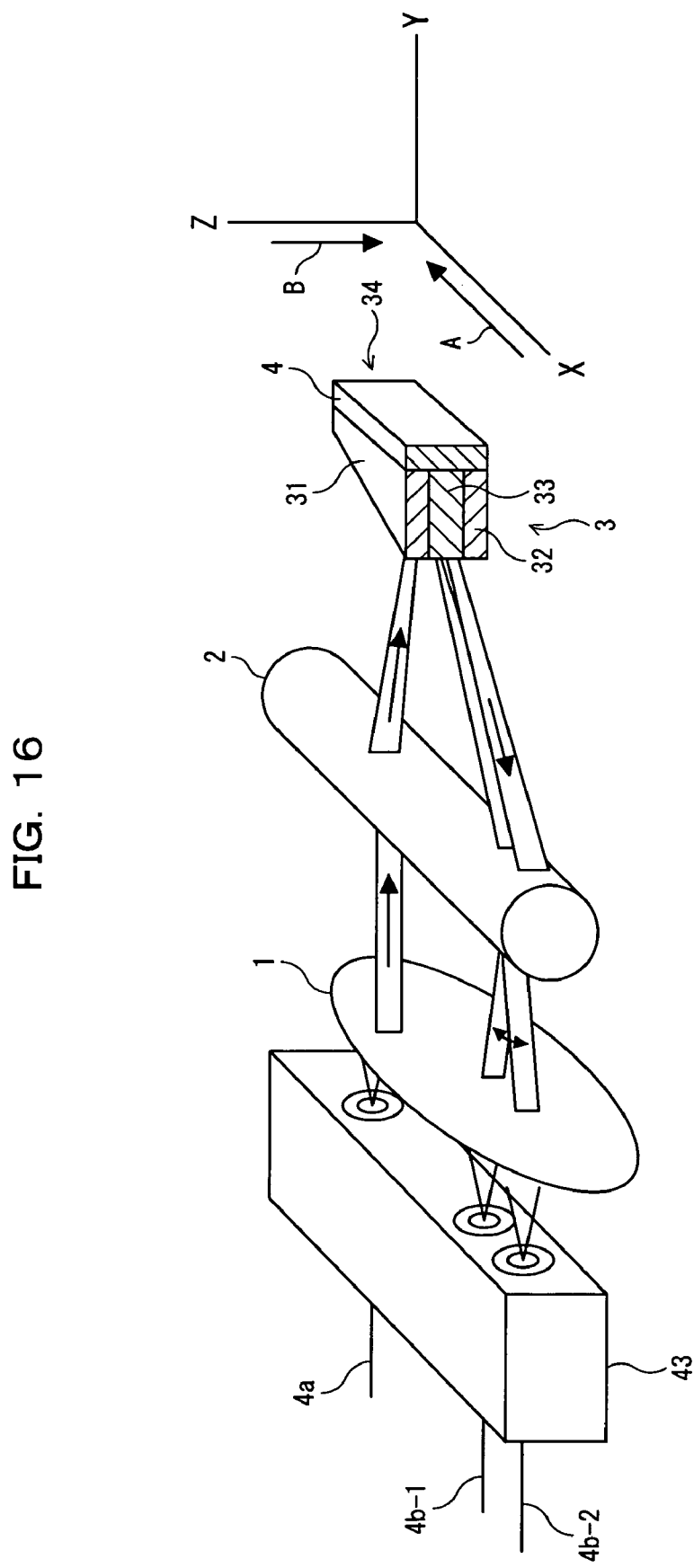
FIG. 16 is a schematic perspective view showing a modified example of the variable optical attenuator of FIG. 14.
Figure 17:
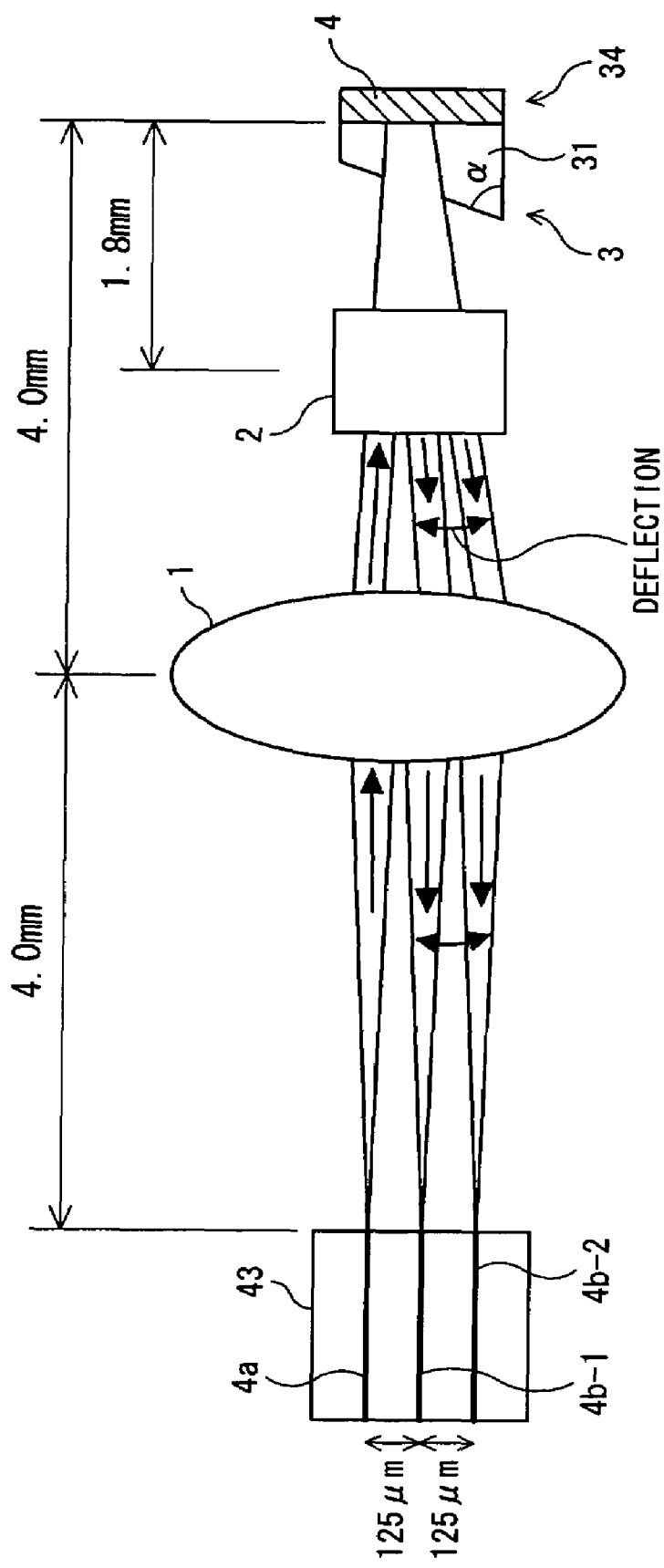
FIG. 17 is a schematic side view of the optical switch on arrow B of FIG. 16, describing an optical path in the optical switch.

The arrangement of various elements of the optical switch and optical paths therein are shown in FIG. 17, which is a schematic side view of the optical switch on arrow B of FIG. 16, describing an optical path in the optical switch.

(B4) 2×2 Optical Switch with an Adjustable Optical Deflector Employed Therein

Figure 18:
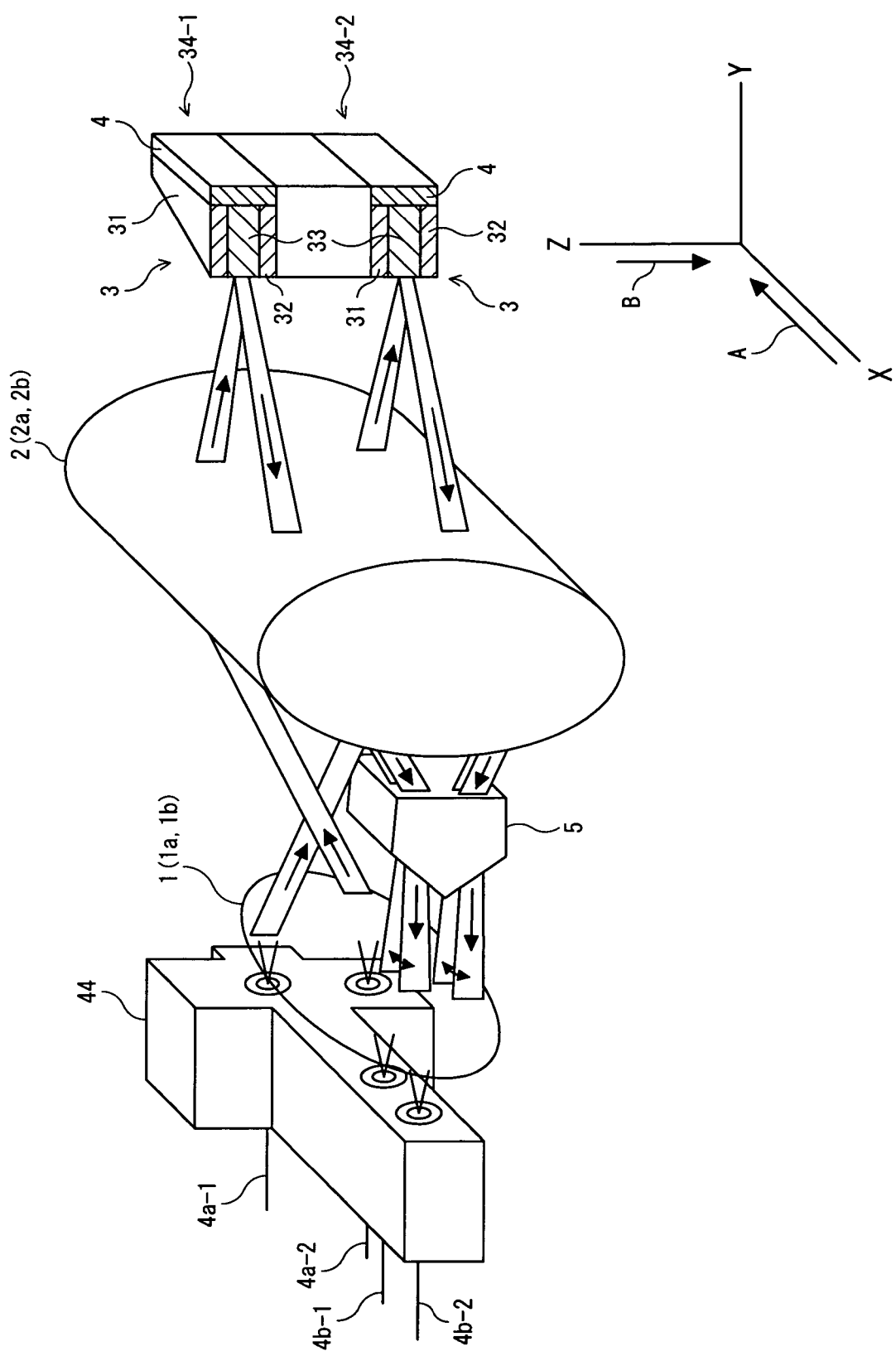
FIG. 18 is a schematic perspective view showing a construction of a 2×2 optical switch which functions as an optical device employing an adjustable optical deflector of FIG. 1 through FIG. 3, with optical paths being illustrated therein.

FIG. 18 is a schematic perspective view showing a construction of a 2×2 optical switch which functions as an optical device employing an adjustable optical deflector of FIG. 1 through FIG. 3, with optical paths being illustrated therein. The 2×2 optical switch of FIG. 18 has m (=2) input optical fibers 4*a*-1 and 4*a*-2, n (=2) output optical fibers 4*b*-1 and 4*b*-2, a collimator lens 1, a cylindrical lens 2, a prism 5, two reflective adjustable optical deflector elements 34-1 and 34-2, each including an adjustable optical deflector element 3 and a reflective element 4, similar to the aforementioned ones in FIG. 1 through FIG. 3.

The input optical fibers 4*a*-1 and 4*a*-2 are disposed adjacent to each other in the Z-axis direction in FIG. 18; the output optical fibers 4*b*-1 and 4*b*-2 are disposed adjacent to each other in the X-axis direction in FIG. 18. All of the optical fibers are secured by a 4-core ferrule 44, which is placed in such a manner that the cores of the output optical fibers 4*b*-1 and 4*b*-2 are placed at positions where light is concentrated by the output collimator lens 1 in accordance with the output angle of the transmitted light (reflected light) which has passed through the reflective adjustable optical deflector elements 34-1 and 34-2.

Figure 20:
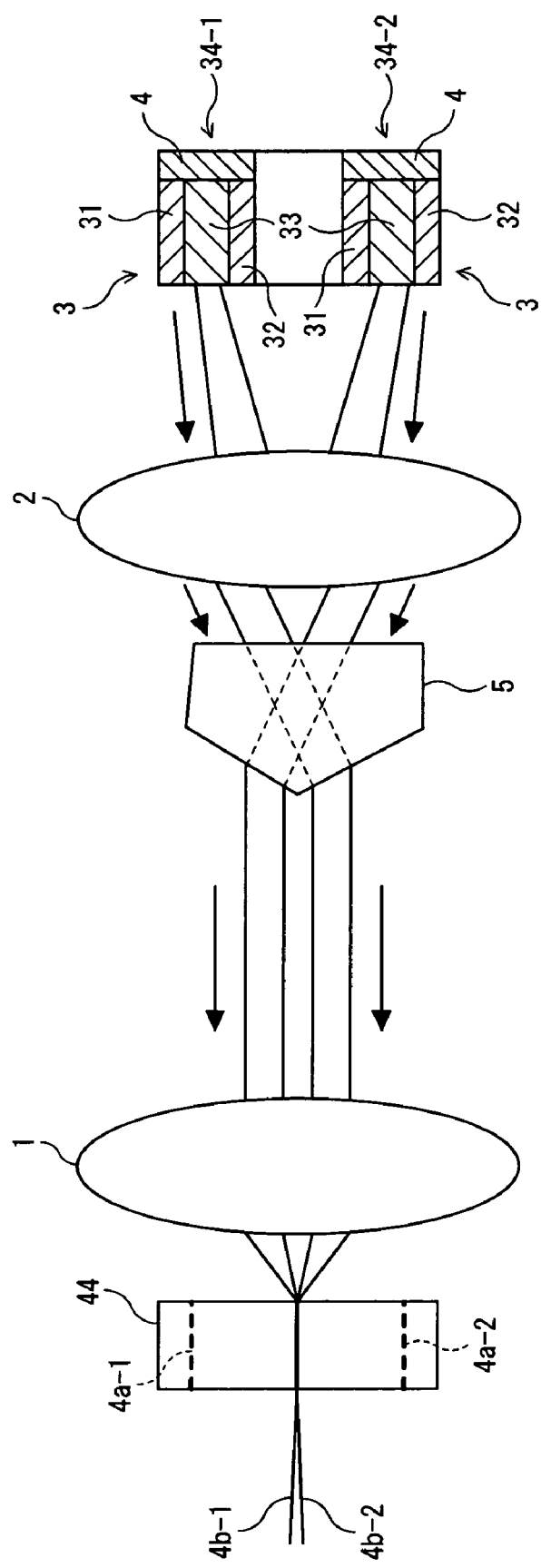
FIG. 20 is a schematic side view of the optical switch on arrow A of FIG. 18, describing an optical path (a return path) in the optical switch of FIG. 18.

Here, the prism (optical path changing means) 5 which changes optical paths between the input optical fibers, 4*a*-1 and 4*a*-2, and the output optical fibers, 4*b*-1 and 4*b*-2, in accordance with a layout relationship between the input optical fibers, 4*a*-1 and 4*a*-2, and the output optical fibers, 4*b*-1 and 4*b*-2. As shown in FIG. 20, the prism 5 has a shape, size, and position, such that a couple of beams of collimated light (light reflected by the reflective adjustable optical deflector element 34-1 and 34-2) that have been collimated by the cylindrical lens 2 travel in parallel with each other on the Y-Z plane of FIG. 18. FIG. 20 is a schematic side view of the optical switch on arrow A of FIG. 18.

The collimator lens 1 is equivalent to the single lens used in the optical devices of FIG. 9, FIG. 10, and FIG. 16, to realize both of the collimator lenses 1*a* and 1*b* on the input (go) and the output (return) path, respectively, for downsizing. Further, the cylindrical lens 2 is also equivalent to the single lens used to realize both of the cylindrical lenses 2*a* and 2*b* on the input and the output path, respectively, for downsizing. However, separate lenses can of course be arranged on the input and the output path.

Figure 19:
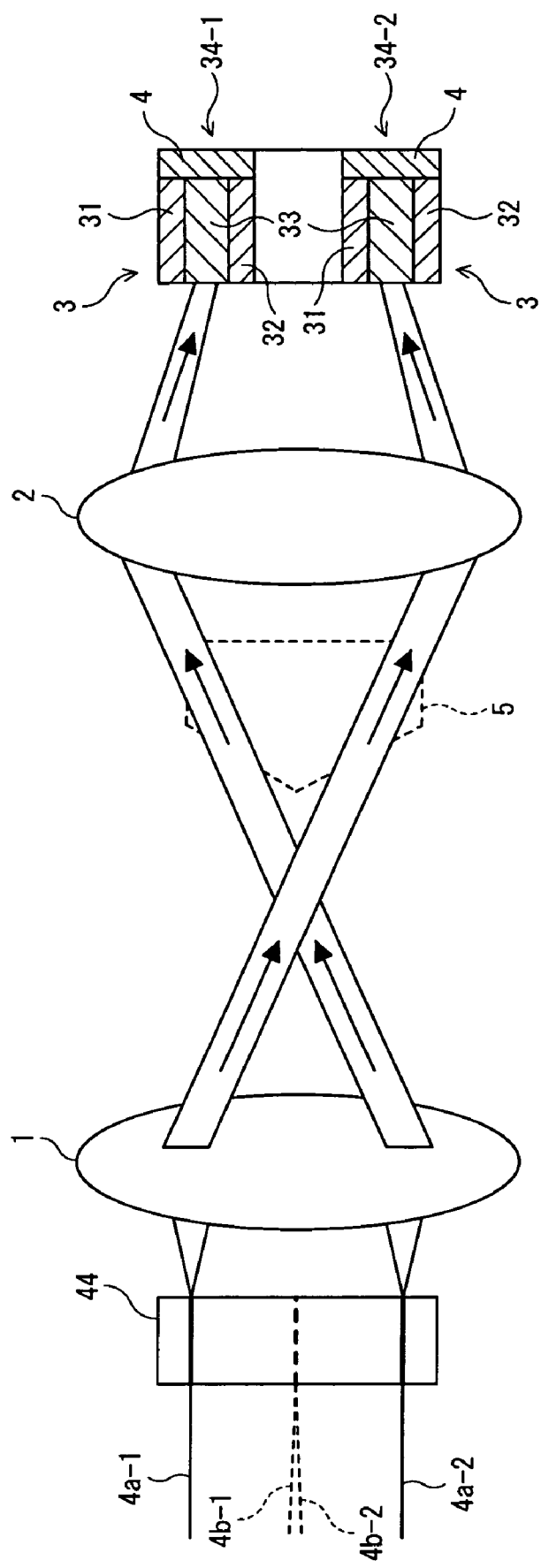
FIG. 19 is a schematic side view of the optical switch on arrow A of FIG. 18, describing an optical path (a go path) in the optical switch of FIG. 18.

Here, a description will be made hereinbelow of an operation of the 2×2 optical switch with the foregoing construction. First of all, as shown in FIG. 19, light output from the input optical fibers 4a-1 and 4a-2, disposed next to each other in the Z-axis direction of FIG. 18, enters an upper and a lower part of the collimator lens 1, respectively, and is then collimated into two collimated beams that travel in different directions (in the directions such that the two beams cross each other on the Y-Z plane of FIG. 18).

The light wave phase of each of the collimated beams is concentrated by the cylindrical lens 2 only in the Z-axis direction, and the light then enters the reflective adjustable optical deflector elements 34-1 and 34-2 whose reflective elements 4 are positioned at focusing points of the cylindrical lens 2. The two light beams are then reflected by the reflective elements 4 of the reflective adjustable optical deflector elements 34-1 and 34-2, and are then collimated by the cylindrical lens 2, and enter the prism 5.

As a result, the two collimated light beams travel in directions parallel with each other on the Y-Z plane, and enter the collimator lens 1 in the form of parallel beams. Accordingly, both of the collimated beams are concentrated by the collimator lens 1 on the same position in the Z direction of FIG. 18.

The electrodes 31 and 32 of the adjustable optical deflector element 3 are applied with changing voltages, whereby the angle of travel of light on the X-Y plane is also varied, so that the focusing points of the collimator lens 1 are shifted in parallel with the X axis of FIG. 18. Accordingly, the light output from the input optical fiber 4a-1 or 4a-2 can be selectively output (switched) to the output optical fibers 4b-1 or 4b-2, by applying a predetermined voltage to the reflective adjustable optical deflector elements 34-1 and 34-2. In consequence, a 2×2 optical switch is realized.

Although the input optical fibers 4a-1 and 4a-2 and the output optical fibers 4b-1 and 4b-2 are secured in a single 4-core ferrule 44 in the foregoing example, two separate ferrules can be alternatively provided for the input and the output end. The input-end ferrule holds the input optical fibers 4a-1 and 4a-2; the output-end ferrule holds the output optical fibers 4b-1 and 4b-2. This arrangement will facilitate assembly processes when manufacturing the optical device.

Further, although a 2×2 optical switch is described in the foregoing example, it is theoretically possible to increase the number of input optical fibers and also the number of the output optical fibers, to realize an m×n optical switch. Still further, it is possible to realize an m×1 (or n>1) optical switch (optical selector), which selects one beam ejected from one of m input optical fibers and concentrates (switches) the light into a single output optical fiber.

In this manner, since this embodiment provides an adjustable optical deflector which deflects light by changing the refractive index of the electro-optical element 33 and which uses the reflective element 4 to reflect the light, it is possible to provide down-sized optical devices, such as variable optical attenuators, optical shutters, and optical switches, with increased response speed in comparison with the previous ones. In addition, since the present invention is an application of micro optics technology, it is possible to reduce an insertion loss more than previous optical devices.

In consequence, it is possible to provide optical devices that can sufficiently support WDM transmission devices, on which numerous wavelengths are transmitted at high speed.

Moreover, the present invention should by no means be limited to the above-illustrated embodiment, but various changes or modifications may be suggested without departing from the gist of the invention.

As described above, the present invention employs a reflective adjustable optical deflector, thereby making it possible to realize down-sized optical devices, such as adjustable optical deflectors, optical shutters, and optical switches, with high-speed response and low insertion loss, in comparison with previous optical devices. Hence, the present invention can fully support optical transmission technology, in particular, a recent WDM transmission technology, in which numerous wavelengths are transmitted at high speed. The usefulness of the present invention is thus considered to be very high.

What is claimed is:

1. A reflective adjustable optical deflector comprising:
   a cylindrical lens which receives collimated light and concentrates the collimated light;
   an adjustable optical deflector element positioned with respect to said cylindrical lens so that the concentrated light is received by, but not concentrated on, said adjustable optical deflector element, said adjustable optical deflector element being an electro-optical, refractive index-controllable element which is wedge-shaped on a travel plane of the received light and has a refractive index which changes in accordance with an externally input signal to deflect the received light and thereby output the received light at an output angle that depends on the externally input signal;
   a reflector element which reflects the light output from said adjustable optical deflector element; and
   an output collimator which collimates the light reflected by said reflector element.

2. A reflective adjustable optical deflector as set forth in claim 1, wherein said adjustable optical deflector element includes a PLZT crystal.

3. A reflective adjustable optical deflector as set forth in claim 1, wherein said reflector element is a reflective plate or a reflective film disposed on an output surface of said adjustable, optical deflector element.

4. A reflective adjustable optical deflector as set forth in claim 1, wherein the cylindrical lens focuses the collimated light on the reflector element.

5. An optical device that employs a reflective adjustable optical deflector, said optical device comprising:
   an input optical fiber;
   an input collimator which collimates light output from said input optical fiber;
   a cylindrical lens which concentrates collimated light output from said input collimator;
   a reflective adjustable optical deflector including:
      an adjustable optical deflector element positioned with respect to said cylindrical lens so that the concentrated light is received by, but not concentrated on, said adjustable optical deflector element, said adjustable optical deflector element being an electro-optical, refractive index-controllable element which is wedge-shaped on a travel plane of the received light and has a refractive index which changes in accordance with an externally input signal to deflect the received light and thereby output the received light at an output angle that depends on the externally input signal, and
      a reflector element which reflects the light output from said adjustable optical deflector element;
   an output collimator which receives and collimates the light reflected from said reflector element of said reflective adjustable optical deflector;

an output concentrator which concentrates the light collimated by said output collimator, to thereby output concentrated light; and an output optical fiber which is disposed in such a manner that its core is located at a position at which the concentrated light output from said output concentrator is concentrated.

6. An optical device that employs the reflective adjustable optical deflector as set forth in claim 5, wherein said optical device changes said output angle by controlling the externally input signal, so as to change an amount of light which is output from said output concentrator and is concentrated onto the core of said output optical fiber, said optical device thereby functioning as a variable optical attenuator which is capable of varying an optical output intensity of said output optical fiber.

7. An optical device that employs the reflective adjustable optical deflector as set forth in claim 5, wherein said optical device changes said output angle by controlling the externally input signal, so as to concentrate the light output from said output collimator at another position than the core of said output optical fiber, said optical device thereby functioning as an optical shutter which shuts out optical output of said output optical fiber.

8. An optical device that employs the reflective adjustable optical deflector as set forth in claim 5, wherein said input optical fiber and said output optical fiber are integrally fastened by a 2-core ferrule, and said input collimator and said output concentrator are realized by a single lens.

9. An optical device that employs the reflective adjustable optical deflector as set forth in claim 5, wherein said input optical fiber and said output optical fiber are integrally fastened by a 2-core ferrule, and said cylindrical lens and said output collimator are realized by a single lens.

10. An optical device that employs the reflective adjustable optical deflector as set forth in claim 5, wherein said input optical fiber and said output optical fiber are integrally fastened by a 2-core ferrule, and said input collimator and said output concentrator are realized by a single lens, and said cylindrical lens and said output collimator are realized by a single lens.

11. An optical device that employs the reflective adjustable optical deflector as set forth in claim 5, wherein n (n is an integer equal to or greater than 2) of said input optical fibers and n of said output optical fibers are provided, and these (2×n) optical fibers are integrally fixed by a (2×n)-core ferrule, and wherein said input collimator, which collimates light output from each of said n input optical fibers and said output concentrator, which concentrates n collimated light beams output from said output collimator into n respective output optical fibers, are realized by a single lens.

12. An optical device comprising:

an input optical fiber, an input collimator which collimates light output from said input optical fiber;

a cylindrical lens which concentrates collimated light output from said input collimator;

a reflective adjustable optical deflector including:

an adjustable optical deflector element positioned with respect to said cylindrical lens so that the concentrated light is received by, but not concentrated on, said adjustable optical deflector element, said adjustable optical deflector element being an electro-optical, refractive index-controllable element which is wedge-shaped on a travel plane of the received light and has a refractive index which changes in accordance with an externally input signal to deflect the received light and thereby output the received light at an output angle that depends on the externally input signal, and a reflector element which reflects the light output from said adjustable optical deflector element;

an output collimator which receives and collimates the light reflected from said reflector element of said reflective adjustable optical deflector;

an output concentrator which concentrates the light collimated by said output collimator, to thereby output concentrated light; and n (n is an integer equal to or greater than 2) output optical fibers which are disposed in such a manner that their cores are located at a plurality of positions on which the concentrated light output from said output concentrator is concentrated in accordance with said output angle, said optical device thereby functioning as a 1×n optical switch which concentrates the light output from said output concentrator onto the core of one of said n output optical fibers, by switching the externally input signal into a predetermined value so as to change said output angle.

13. An optical device as set forth in claim 12, wherein said input optical fiber and said n output optical fibers are integrally fastened by a multi-core ferrule, and said input collimator and said output concentrator are realized by a single lens.

14. An optical device as set forth in claim 12, wherein said input optical fiber and said n output optical fibers are integrally fastened by a multi-core ferrule, and said cylindrical lens and said output collimator are realized by a single lens.

15. An optical device as set forth in claim 12, wherein said input optical fiber and said n output optical fibers are integrally fastened by a multi-core ferrule, and said input collimator and said output concentrator are realized by a single lens, and said cylindrical lens and said output collimator are realized by a single lens.

16. An optical device as set forth in claim 12, wherein said 1×n optical switch continuously changes the externally input signal, to change an amount of light concentrated onto the core of one output optical fiber so as to control an optical output intensity of said one optical output fiber, said 1×n optical switch thereby being operable also as a variable optical attenuator which is capable of changing an optical output intensity of said one output optical fiber.

17. An optical device as set forth in claim 16, wherein said 1×n optical switch includes:

a controllable optical attenuation signal source which generates the externally input signal that continuously changes to activate the function of the variable optical attenuator; and a switching signal source which generates the externally input signal of the predetermined value.

18. An optical device comprising:

n (n is an integer equal to or greater than 2) input optical fibers, an input collimator which collimates light output from said n input optical fibers;

a cylindrical lens which concentrates collimated light output from said input collimator;

n reflective adjustable optical deflectors each including:

an adjustable optical deflector element positioned with respect to said cylindrical lens so that concentrated light from said cylindrical lens is received by, but not concentrated on, said adjustable optical deflector element, said adjustable optical deflector element being an electro-optical, refractive index-controllable element which is wedge-shaped on a travel plane of the received light and has a refractive index which changes in accordance with an externally input signal to deflect the received light and thereby output the received light at an output angle that depends on the externally input signal, and a reflector element which reflects the light output from said adjustable optical deflector element;

an output collimator which receives and collimates light reflected from said reflector element of each said reflective adjustable optical deflector;

an output concentrator which concentrates the collimated light output from said output collimator; and m (m is an integer equal to or greater than 1) output optical fibers which are disposed in such a manner that their cores are located at one or more positions on which the light concentrated by said output collimator is concentrated in accordance with the output angles of the adjustable optical deflector elements, said optical device thereby functioning as an n×m optical switch which concentrates the light, input from one of said n input optical fibers and output from said output concentrator, onto one of the cores of said m output optical fibers, by switching the externally input signal of a respective adjustable optical deflector element into a predetermined value so as to change the output angle of the respective adjustable optical deflector element.

19. An optical device as set forth in claim 18, said optical device further comprising an optical path changing means which changes, if m is equal to or greater than 2, an optical path between said input optical fibers and said output optical fibers in accordance with a layout relationship between said input optical fibers and said output optical fibers.

20. An optical device as set forth in claim 18, wherein said n input optical fibers and said m output optical fibers are integrally fastened by a multi-core ferrule, and said input collimator and said output concentrator are realized by a single lens.

21. An optical device as set forth in claim 18, wherein said n input optical fibers and said m output optical fibers are integrally fastened by a multi-core ferrule, and said cylindrical lens and said output collimator are realized by a single lens.

22. An optical device as set forth in claim 18, wherein said n input optical fibers and said m output optical fibers are integrally fastened by a multi-core ferrule, and said input collimator and said output concentrator are realized by a single lens, and said cylindrical lens and said output collimator are realized by a single lens.

23. An apparatus comprising:

a cylindrical lens receiving collimated light and concentrating the collimated light;

an electro-optical, refractive index-controllable element positioned with respect to the cylindrical lens so that the concentrated light is received by, but not concentrated on, the electro-optical, refractive index-controllable element, wherein the electro-optical, refractive index-controllable element is wedge-shaped on a travel plane of the received light and has a refractive index which changes in accordance with an external signal applied to the electro-optical, refractive index-controllable element to deflect the received light and thereby output the received light from the electro-optical, refractive index-controllable element at an output angle that depends on the applied signal;

a reflector reflecting the light output from the element; and an output collimator collimating the light reflected by the reflector.

24. An apparatus as in claim 23, wherein the apparatus operates as a variable optical attenuator which changes the applied external signal to change the output angle and thereby provide variable attenuation.

25. An apparatus as in claim 23, wherein the apparatus operates as an optical shutter.

26. An apparatus as set forth in claim 23, wherein the electro-optical, refractive index-controllable element is a PLZT crystal.

27. An apparatus as in claim 23, wherein the cylindrical lens focuses the collimated light on the reflector.

28. An apparatus comprising:

a cylindrical lens receiving collimated light and focusing the collimated light;

a PLZT crystal positioned with respect to the cylindrical lens so that the focused light is received by, is not focused on, and passes through, the PZLT crystal, wherein the PLZT crystal is wedge-shaped on a travel plane of the received light and has a refractive index which changes in accordance with an external signal applied to the PLZT crystal to thereby output the received light from the PLZT crystal at an output angle that depends on the applied signal;

a reflector positioned with respect to the cylindrical lens and the PLZT crystal so that the light passing through the PLZT crystal is focused by the cylindrical lens on the reflector and is thereby reflected by the reflector to pass back through the PZLT crystal; and an output collimator collimating the light passing back through the PLZT crystal.

29. An apparatus as in claim 28, wherein the apparatus operates as a variable optical attenuator which changes the applied external signal to change the output angle and thereby provide variable attenuation.

30. An apparatus as in claim 28, wherein the apparatus operates as an optical shutter.

* * * * *

UNITED STATES PATENT AND TRADEMARK OFFICE
CERTIFICATE OF CORRECTION

PATENT NO. : 7,280,718 B2  
APPLICATION NO. : 10/994789  
DATED : October 9, 2007  
INVENTOR(S) : Hiroshi Nagaeda It is certified that error appears in the above-identified patent and that said Letters Patent is hereby corrected as shown below:

Title page of Patent:

Please insert the following information which was omitted:

--Related U.S. Application Data

(63) Continuation of Application No. PCT/JP02/06583, filed on June 28, 2002.--

Signed and Sealed this

Fifteenth Day of July, 2008

JON W. DUDAS  
*Director of the United States Patent and Trademark Office*